United States Patent
Itov et al.

(10) Patent No.: US 11,230,474 B2
(45) Date of Patent: Jan. 25, 2022

(54) PROCESS FOR PRODUCING ISOMER ENRICHED HIGHER SILANES

(71) Applicant: L'Air Liquide, Société Anonyme pour l'Etude et l'Exploitation des Procédés Georges Claude, Paris (FR)

(72) Inventors: Gennadiy Itov, Flemington, NJ (US); Jian Hou, Delmar, NY (US); Grigory Nikiforov, Bridgewater, NJ (US)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 59 days.

(21) Appl. No.: 16/409,133

(22) Filed: May 10, 2019

(65) Prior Publication Data

US 2020/0115242 A1    Apr. 16, 2020

Related U.S. Application Data

(63) Continuation-in-part of application No. 16/158,003, filed on Oct. 11, 2018, now abandoned.

(51) Int. Cl.
*C01B 33/04*    (2006.01)
*B01D 3/14*    (2006.01)

(52) U.S. Cl.
CPC ............ *C01B 33/046* (2013.01); *B01D 3/143* (2013.01); *C01P 2006/80* (2013.01)

(58) Field of Classification Search
CPC ...... B01J 2229/20; B01J 29/126; B01J 29/40; B01J 29/44; B01J 29/46; B01J 29/7007; B01J 29/7407; B01J 29/7415; B01J 29/7484; B01J 37/04; B01J 37/088; C01B 33/04
See application file for complete search history.

(56) References Cited

U.S. PATENT DOCUMENTS

| 6,027,705 A | 2/2000 | Kitsuno et al. |
| 7,906,094 B2 | 3/2011 | Bourasseau et al. |

(Continued)

FOREIGN PATENT DOCUMENTS

| DE | 2 139 155 | 2/1973 |
| JP | 2000 031066 | 1/2000 |

(Continued)

OTHER PUBLICATIONS

Gelest inc. "n-tetrasilane Safety Data Sheet SIT78880.0" www.gelest.com, 2015 Version: 2.0 (Year: 2015).*
International Search Report and Written Opinion for corresponding PCT/US1019/055786, dated Jan. 29, 2020.
Hart, J. et al., "Tetrasilane and digermane for the ultra-high vacuum chemical vapor deposition of SiGe alloys," Thin Solid Films, 2016, 604, 23-27.

(Continued)

*Primary Examiner* — Anthony J Zimmer
*Assistant Examiner* — Syed T Iqbal
(74) *Attorney, Agent, or Firm* — Allen E. White

(57) ABSTRACT

Methods of selectively synthesizing n-tetrasilane are disclosed. N-tetrasilane is prepared by pyrolysis of silane ($SiH_4$), disilane ($Si_2H_6$), trisilane ($Si_3H_8$), or mixtures thereof. More particularly, the disclosed synthesis methods tune and optimize the n-tetrasilane:i-tetrasilane isomer ratio. The isomer ratio may be optimized by selection of process parameters, such as temperature, residence time, and the relative amount of starting compounds. The disclosed synthesis methods allow facile preparation of n-tetrasilane.

16 Claims, 8 Drawing Sheets

(56) References Cited

U.S. PATENT DOCUMENTS

| | | | |
|---|---|---|---|
| 8,163,261 B2 | 4/2012 | Hazeltine | |
| 8,969,610 B2 | 3/2015 | Wieber et al. | |
| 9,034,292 B2 | 5/2015 | Lee et al. | |
| 2009/0155454 A1 | 6/2009 | Masuda et al. | |
| 2012/0164327 A1 | 6/2012 | Sato et al. | |
| 2012/0263639 A1* | 10/2012 | Brausch | B01J 37/0201 423/347 |
| 2013/0183223 A1 | 7/2013 | Wieber et al. | |
| 2014/0120678 A1 | 5/2014 | Shinriki et al. | |
| 2016/0030911 A1* | 2/2016 | Lang | B01J 19/088 204/164 |
| 2016/0126093 A1 | 5/2016 | Dube et al. | |
| 2016/0297997 A1 | 10/2016 | Cadiz Bedini | |
| 2017/0018427 A1 | 1/2017 | Huang et al. | |
| 2019/0256361 A1* | 8/2019 | Nomura | B01D 53/229 |

FOREIGN PATENT DOCUMENTS

| | | | |
|---|---|---|---|
| JP | 3 185 817 | | 7/2001 |
| JP | 3 484 815 | | 1/2004 |
| KR | 20170013076 A | * | 2/2017 |
| WO | WO 2012 002994 | | 1/2012 |
| WO | WO 2017 018771 | | 2/2017 |
| WO | WO 2017 018772 | | 2/2017 |

OTHER PUBLICATIONS

Hazbun, R. et al., "Silicon epitaxy using tetrasilane at low temperatures in ultra-high vacuum chemical vapor deposition," Journal of Crystal Growth, 2016, 444, 21-27.

Kanoh, H. et al., "Chemical vapor deposition of amorphous silicon using tetrasilane," Japanese Journal of Applied Physics, Part 1: Regular Papers, Short Notes & Review Papers, 1993, 32(6A), 2613-2619.

Martin, J.G. et al.,"Thermal decomposition kinetics of polysilanes: disilane, trisilane, and tetrasilane," J. of Chem. Kin., vol. 22, (1990), 613.

Tebben, E.M. et al., "Pyrolysis of disilane and trisilane," Inorg. Chem. vol. 8, No. 8, Aug. 1969, 1787-1789.

Timms, P.L. et al., "The silicon-germanium hydrides," J. Chem. Soc., 1964, 1467-1475.

Vanderwielen, A.J. et al., "Kinetics of the thermal decomposition of methyldisilanea and trisilane," JACS, vol. 97:5 (1975), 993-998.

Yoshida, K. et al., "Thermal decomposition mechanism of disilane," J. Phys. Chem. A, 2006, 110, 4726-4731.

Zia, M. et al., "Comparative thermal stability studies of some isomeric phenolic β-diketones and their phenolic pyrazoles by thermogravimetric analysis," Journal of Contemporary Research in Chemistry 92016) 1(1): 34-41.

* cited by examiner

PROCESS FOR PRODUCING ISOMER ENRICHED HIGHER SILANES

CROSS REFERENCE TO RELATED APPLICATIONS

This application is a continuation-in-part of U.S. patent application Ser. No. 16/158,003, filed Oct. 11, 2018, the entire contents of which are incorporated herein by reference.

TECHNICAL FIELD

Methods of selectively synthesizing n-tetrasilane are disclosed. N-tetrasilane is prepared by pyrolysis of silane ($SiH_4$), disilane ($Si_2H_6$), trisilane ($Si_3H_8$), or mixtures thereof. More particularly, the disclosed synthesis methods tune and optimize the n-tetrasilane:i-tetrasilane isomer ratio. The isomer ratio may be optimized by selection of process parameters, such as temperature, residence time, and the relative amount of starting compounds. The disclosed synthesis methods allow facile preparation of n-tetrasilane.

BACKGROUND

Polysilanes have been used in a variety of industries.

Vapor deposition of silicon-containing films using polysilanes is disclosed by JP Pat No 3,185,817 to Seiko Epson Corp.; Kanoh et al., Japanese Journal of Applied Physics, Part 1: Regular Papers, Short Notes & Review Papers 1993, 32(6A), 2613-2619; JP Pat No 3,484,815 to Showa Denko KK; and JP Pat App Pub No 2000/031066 to Showa Denko KK, among others.

Epitaxial Si-containing films, such as Si, SiGe, SiC, SiN, and SiO, have been grown using polysilanes as disclosed by Hazbun et al., *Journal of Crystal Growth* 2016, 444, 21-27; US Pat App Pub No 2017/018427 to Yi-Chiau Huang et al.; US Pat App Pub No 2016/126093 to Dube et al.; and Hart et al., *Thin Solid Films* 2016, 604, 23-27]; among others.

Polysilanes have also been used to form larger polymers. See, e.g., US Pat App Pub No 2016/0297997 to Forschungzentrum Jülich Gmbh.

Converting lower silanes into higher silanes has been studied extensively both for research and for commercial purposes. Pyrolysis has been studied. See, e.g., Timms et al., J. Chem. Soc. 1964 pp. 1467-1475; Tebben et al., Inorg. Chem. Vol. 8, No. 8 Aug. 1969; Vanderwielen et al., JACS, v. 97 (1975) p. 993; Martin et al., J. of Chem. Kin., v. 22, p. 613 (1990); Yoshida et al., J. Phys. Chem. A, 2006, 110, 4726-4731; DE2139155 to Peter Plichta; U.S. Pat. No. 6,027,705 to Kitsuno et al.; U.S. Pat. No. 7,906,094 to Bourasseau et al.; U.S. Pat. No. 8,163,261 to Hazeltine: U.S. Pat. No. 8,969,610 to Wieber et al.; U.S. Pat. No. 9,034,292 to OCI Materials Co., Ltd.; WO2017/018771 to SK-Materials Co., Ltd.; and WO2017/018771 and WO2017/018772 to SK-Materials Co., Ltd.

All these disclosures notwithstanding, commercial use of polysilanes remains elusive.

SUMMARY

Methods of selectively synthesizing n-tetrasilane are disclosed. A n-$Si_4H_{10}$:i-$Si_4H_{10}$ mixture having a ratio ranging from approximately 5:1 to approximately 15:1 is produced by heating $Si_2H_6$ and optionally $Si_3H_8$ in a reactor to a temperature ranging from approximately 250° C. to approximately 360° C. The disclosed processes may further include one or more of the following aspects:

the method not utilizing $H_2$;
the method not utilizing a catalyst;
the method not utilizing glass wool;
the method not utilizing a vacuum;
the method not producing any solid polysilane reaction products;
the pressure of the reactor ranging from approximately atmospheric pressure to approximately 30 psig;
the pressure of the reactor ranging from approximately atmospheric pressure to approximately 15 psig;
the method further comprising pre-heating the $Si_2H_6$ and optional $Si_3H_8$;
the method further comprising cooling the n-$Si_4H_{10}$:i-$Si_4H_{10}$ mixture;
wherein the pre-heating and cooling occurs in the reactor;
maintaining $Si_2H_6$ and optional $Si_3H_8$ at the temperature for a time period ranging from approximately 5 seconds to approximately 30 seconds;
maintaining $Si_2H_6$ and optional $Si_3H_8$ at the temperature for a time period ranging from approximately 5 seconds to approximately 10 seconds when the temperature ranges from approximately 360° C. to approximately 380° C.;
maintaining $Si_2H_6$ and optional $Si_3H_8$ at the temperature for a time period ranging from approximately 10 seconds to approximately 20 seconds when the temperature ranges from approximately 280° C. to approximately 360° C.;
maintaining $Si_2H_6$ and optional $Si_3H_8$ at the temperature for a time period ranging from approximately 20 seconds to approximately 30 seconds when the temperature ranges from approximately 250° C. to approximately 280° C.;
the mixture comprising between approximately 0.1% mol/mol to approximately 25% mol/mol $Si_3H_8$ and between approximately 75% mol/mol and 99.9% mol/mol $Si_2H_6$;
the mixture comprising between approximately 0.1% mol/mol to approximately 10% mol/mol $Si_3H_8$ and between approximately 90% mol/mol and 99.9% mol/mol $Si_2H_6$;
the mixture comprising 100% mol/mol $Si_2H_6$;
recycling unreacted $Si_2H_6$;
recycling unreacted $Si_2H_6$ and $Si_3H_8$;
the ratio of n-$Si_4H_{10}$:i-$Si_4H_{10}$ ranging from approximately 8:1 to approximately 15:1;
fractionally distilling the n-$Si_4H_{10}$:i-$Si_4H_{10}$ mixture to produce a Si-containing film forming composition comprising approximately 90% w/w to approximately 100% w/w n-$Si_4H_{10}$;
fractionally distilling the n-$Si_4H_{10}$:i-$Si_4H_{10}$ mixture to produce a Si-containing film forming composition comprising approximately 95% w/w to approximately 100% w/w n-$Si_4H_{10}$;
fractionally distilling the n-$Si_4H_{10}$:i-$Si_4H_{10}$ mixture to produce a Si-containing film forming composition comprising approximately 97% w/w to approximately 100% w/w n-$Si_4H_{10}$;
fractionally distilling the n-$Si_4H_{10}$:i-$Si_4H_{10}$ mixture to produce a Si-containing film forming composition comprising approximately 0% w/w to approximately 10% w/w i-$Si_4H_{10}$;

fractionally distilling the n-$Si_4H_{10}$:i-$Si_4H_{10}$ mixture to produce a Si-containing film forming composition comprising approximately 0% w/w to approximately 5% w/w i-$Si_4H_{10}$; or fractionally distilling the n-$Si_4H_{10}$:i-$Si_4H_{10}$ mixture to produce a Si-containing film forming composition comprising approximately 0% w/w to approximately 3% w/w i-$Si_4H_{10}$.

Si-containing film forming composition produced by any of the methods disclosed above are also disclosed. The disclosed compositions may further include one or more of the following aspects:

the Si-containing film forming composition comprising approximately 0 ppmw to approximately 100 ppmw halide contaminants;

the Si-containing film forming composition comprising approximately 0 ppmw to approximately 25 ppmw halide contaminants;

the Si-containing film forming composition comprising approximately 0 ppmw to approximately 5 ppmw halide contaminants;

the Si-containing film forming composition comprising approximately 90% w/w to approximately 100% w/w n-$Si_4H_{10}$;

the Si-containing film forming composition comprising approximately 95% w/w to approximately 100% w/w n-$Si_4H_{10}$;

the Si-containing film forming composition comprising approximately 97% w/w to approximately 100% w/w n-$Si_4H_{10}$;

the Si-containing film forming composition comprising approximately 0% w/w to approximately 10% w/w i-$Si_4H_{10}$;

the Si-containing film forming composition comprising approximately 0% w/w to approximately 5% w/w i-$Si_4H_{10}$; and/or the Si-containing film forming composition comprising approximately 0% w/w to approximately 3% w/w i-$Si_4H_{10}$.

Methods of maintaining the vapor pressure of tetrasilane during vapor deposition processes are also disclosed. The vapor deposition processes use any of the Si-containing film forming composition disclosed above. The Si-containing film forming composition is maintained at a vaporizing temperature. The disclosed methods may further include one or more of the following aspects:

the Si-containing film forming composition comprising approximately 90% w/w to approximately 100% w/w n-$Si_4H_{10}$;

the Si-containing film forming composition comprising approximately 95% w/w to approximately 100% w/w n-$Si_4H_{10}$;

the Si-containing film forming composition comprising approximately 97% w/w to approximately 100% w/w n-$Si_4H_{10}$;

the Si-containing film forming composition comprising approximately 0% w/w to approximately 10% w/w i-$Si_4H_{10}$;

the Si-containing film forming composition comprising approximately 0% w/w to approximately 5% w/w i-$Si_4H_{10}$;

the Si-containing film forming composition comprising approximately 0% w/w to approximately 3% w/w i-$Si_4H_{10}$;

the Si-containing film forming composition having an initial vapor pressure at the vaporizing temperature;

the vaporizing temperature ranging from approximately 0° C. to approximately 40° C.;

the vaporizing temperature ranging from approximately 20° C. to approximately 25° C.;

maintaining approximately 80% Pa/Pa of the initial vapor pressure of the Si-containing film forming composition at the vaporizing temperature until approximately 95% w/w of Si-containing film forming composition is consumed;

maintaining approximately 90% Pa/Pa of the initial vapor pressure of the Si-containing film forming composition at the vaporizing temperature until approximately 95% w/w of Si-containing film forming composition is consumed; and/or maintaining approximately 95% Pa/Pa of the initial vapor pressure of the Si-containing film forming composition at the vaporizing temperature until approximately 95% w/w of Si-containing film forming composition is consumed.

Methods of reducing the formation of branched polysilanes during polymerization are also disclosed. The polymerization processes use any of the Si-containing film forming compositions disclosed above. The disclosed methods may further include one or more of the following aspects:

the Si-containing film forming composition comprising approximately 90% w/w to approximately 100% w/w n-$Si_4H_{10}$;

the Si-containing film forming composition comprising approximately 95% w/w to approximately 100% w/w n-$Si_4H_{10}$;

the Si-containing film forming composition comprising approximately 97% w/w to approximately 100% w/w n-$Si_4H_{10}$;

the Si-containing film forming composition comprising approximately 0% w/w to approximately 10% w/w i-$Si_4H_{10}$;

the Si-containing film forming composition comprising approximately 0% w/w to approximately 5% w/w i-$Si_4H_{10}$; and/or the Si-containing film forming composition comprising approximately 0% w/w to approximately 5% w/w i-$Si_4H_{10}$.

Notation and Nomenclature

Certain abbreviations, symbols, and terms are used throughout the following description and claims, and include:

As used herein, the indefinite article "a" or "an" means one or more.

As used herein, the terms "approximately" or "about" mean±10% of the value stated.

As used herein, the term "comprising" is inclusive or open-ended and does not exclude additional, unrecited materials or method steps; the term "consisting essentially of" limits the scope of a claim to the specified materials or steps and additional materials or steps that do not materially affect the basic and novel characteristics of the claimed invention; and the term "consisting of" excludes any additional materials or method steps not specified in the claim.

As used herein, the term "higher silanes" means $Si_nH_{2n+2}$, wherein n=4-100 and the term "lower silanes" means $Si_nH_{2n+2}$ with n=1-3. The higher silanes may be linear or branched.

The standard abbreviations of the elements from the periodic table of elements are used herein. It should be understood that elements may be referred to by these abbreviations (e.g., Si refers to silicon, C refers to carbon, H refers to hydrogen, etc.).

Any and all ranges recited herein are inclusive of their endpoints (i.e., x=1 to 4 or x ranges from 1 to 4 includes x=1, x=4, and x=any number in between), irrespective of whether the term "inclusively" is used.

As used herein, the term "anhydrous" means containing between approximately zero ppmv and approximately 100 ppmv moisture and preferably between approximately zero ppmv and approximately 10 ppmv moisture.

BRIEF DESCRIPTION OF THE DRAWINGS

For a further understanding of the nature and objects of the present invention, reference should be made to the following detailed description, taken in conjunction with the accompanying drawing wherein.

DESCRIPTION OF PREFERRED EMBODIMENTS

Figure 1:
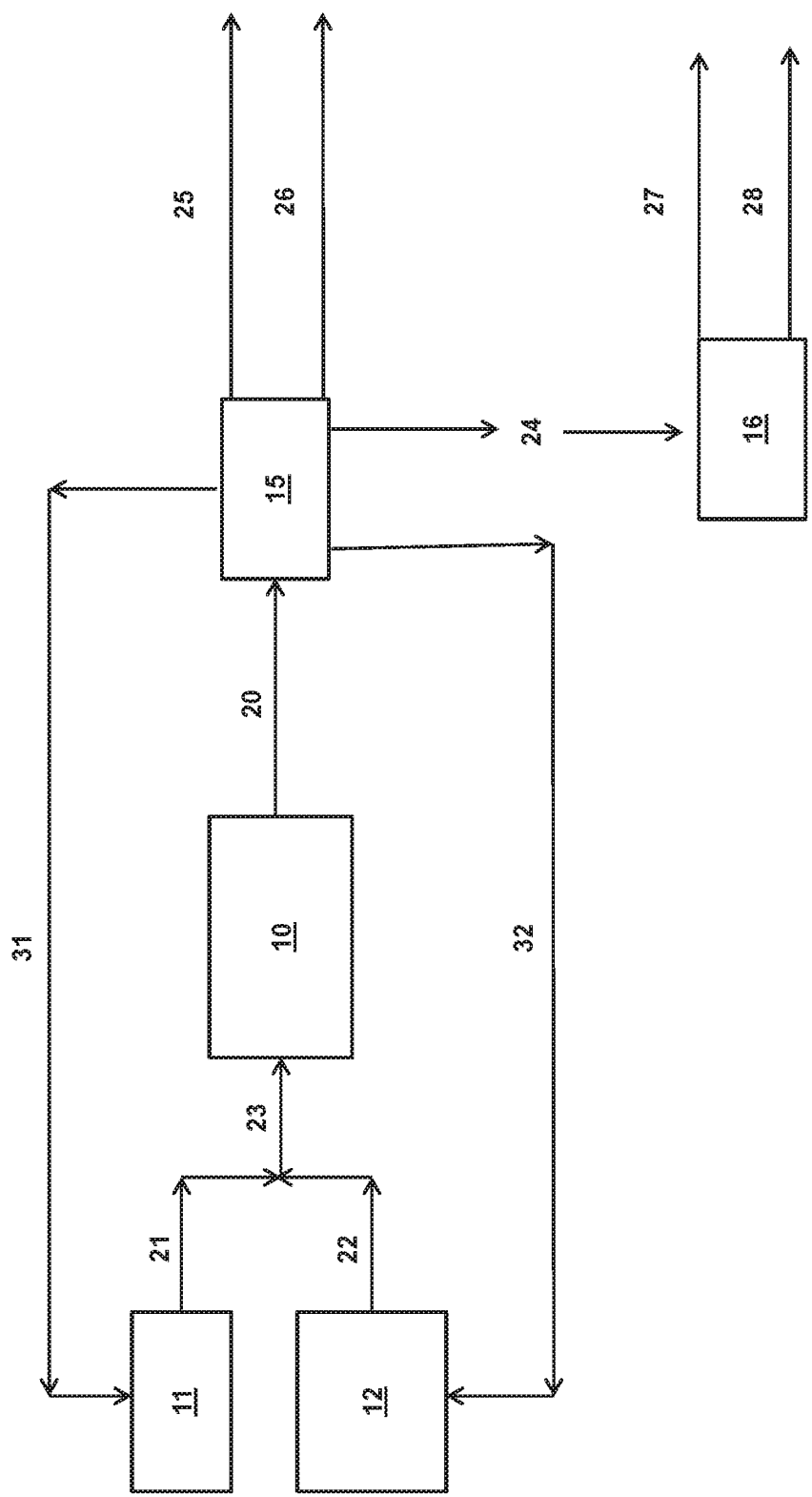
FIG. 1 is a schematic diagram of an exemplary apparatus in which the disclosed synthesis methods may be performed.

Methods of selectively synthesizing n-tetrasilane are disclosed. Isomers of tetrasilane exhibit differences in boiling points. The boiling point of 80-90% n-$Si_4H_{10}$ is 107° C. according to the online catalog from Gelest. In contrast, the boiling point for i-$Si_4H_{10}$ is 101.7° C. Fehér et al., Inorg. Nucl. Chem. Lett., 1973, 9, 931.

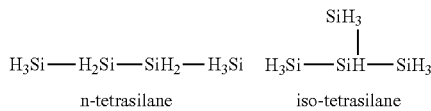

In addition to having different boiling points, the isomers may also have different evaporation behavior and thermal stability, due at least to different steric geometries shown above. These differences may create a drift in any vapor processes if one isomer enriches over time. This effect has been demonstrated with other types of isomers (see, e.g., Mehwash Zia and Muhammad Zia-ul-Haq, Journal of Contemporary Research in Chemistry (2016) 1(1): 34-41).

As a result, supplying a tetrasilane precursor consisting essentially of one isomer, enriched with one isomer, or having a fixed isomer ratio is important for having a reproducible vapor film forming process.

Similarly, polymerization using the different isomers may produce different polymerization products. In other words, iso-tetrasilane may produce a polymer having more branching than one produced by n-tetrasilane.

Applicants have discovered methods of tuning and optimizing the tetrasilane isomer ratio. The pure isomers or isomer enriched mixtures are prepared by pyrolysis of silane ($SiH_4$), disilane ($Si_2H_6$), trisilane ($Si_3H_8$), or mixtures thereof. The lower silane reactants (i.e., $Si_nH_{2n+2}$, with n=1-3) provide an attractive starting material due to commercial availability. One of ordinary skill in the art will recognize that safety protocols are required when working with these reactants and products.

Various process parameters may be adjusted to produce the desired isomer ratio. Exemplary process parameters include the relative amounts of the starting compounds. Temperature and residence time in the flow pyrolysis process may also impact isomer yield. The resulting higher silane products are isomer content specific and high purity.

n-Tetrasilane may be synthesized by heating a $Si_nH_{(2n+2)}$ reactant, wherein n=1-3. The $Si_nH_{(2n+2)}$ reactant may be $SiH_4$, $Si_2H_6$, $Si_3H_8$, or combinations thereof. In the examples that follow, the $Si_nH_{(2n+2)}$ reactant is $Si_2H_6$ alone or mixed with $Si_3H_8$. $Si_2H_6$ alone or mixed with $Si_3H_8$ produces the best $Si_4H_{10}$:$Si_5H_{12}$ ratios and n-$Si_4H_{10}$:i-$Si_4H_{10}$ ratios. Pyrolysis of $Si_2H_6$ alone or mixed with $Si_3H_8$ also produces no to low amounts of solid polysilane by-products, which prevents cleaning and/or reactor clogging issues. These reactants are commercially available.

The reactor is made of passivated stainless steel. The reactor may be jacketed or placed in a heating or cooling bath. The reactor may also be equipped with multiple "injection ports," pressure gauges, diaphragm valves, etc. The reactor is designed to perform the synthesis under an inert atmosphere, such as $N_2$ or a noble gas (i.e., He, Ne, Ar, Kr, or Xe) or under the compounds own vapor pressure (without addition of inert gases). The reactor, stirring mechanism, and any other associated equipment, such as a Schlenk line or glovebox, should be air- and moisture-free using standard drying techniques, such as vacuum, inert gas flow, oven drying, etc.

The reactor and any and all components that come into contact with the reactants and products should have high purity. A high purity reactor is compatible with the lower and higher silanes reactants and products. The high purity reactor is free of impurities that may react with or contaminate the silanes. Typical examples of such reactors are stainless steel canisters, having low surface roughness and mirror finish. The low surface roughness and mirror finish is typically obtained by mechanical polishing and optionally by additional electropolishing. The high purity is typically obtained by treatments that include (a) cleaning steps using dilute acids (HF, $HNO_3$), followed by (b) a rinsing with high purity de-ionized water to ensure the complete removal of traces of the acid, followed by (c) drying of the reactor. The deionized water (DIW) rinsing is typically carried out until the conductivity of the rinsing water decreases below 100 μS/cm, and preferably below 25 μS/cm. The drying step may comprise purge steps using an inert gas such as He, $N_2$, Ar, (preferably $N_2$ or Ar), vacuum steps during which the pressure in the reactor is reduced to accelerate outgassing from the surface, heating of the reactor, or any combination thereof.

The gas used for the purging should be of semiconductor grade, i.e. free of contaminants such as trace moisture and oxygen (<1 ppm, preferably <10 ppb), and particles (<5 particles per litre @ 0.5 µm). The drying step may comprise alternate sequences of purges, during which a certain flow of gas is flown through the vessel, and vacuuming steps. Alternatively, the drying step may be carried out by constantly flowing a purge gas while maintaining a low pressure in the reactor.

The efficiency and end point of the reactor drying can be assessed by measuring the trace $H_2O$ level in the gas emerging from the reactor. With an inlet gas having less than 10 ppb $H_2O$, the outlet gas should have a moisture content ranging from approximately 0 ppm to approximately 10 ppm, preferably ranging from approximately 0 ppm to approximately 1 ppm, and more preferably ranging from approximately 0 ppb to approximately 200 ppb. During the purge steps and vacuum steps, heating the reactor is known to accelerate the drying time. Reactors are typically maintained at a temperature ranging from approximately 40° C. to approximately 150° C. during drying.

Once cleaned and dried, such high purity reactors must have a total leak rate below $1 \times 10^{-6}$ std cm³/s, preferably $<1 \times 10^{-8}$ std cm³/s.

The reactor may also be passivated by exposure to a silylating agent such as silane or disilane prior to the reaction.

One of ordinary skill in the art will recognize the sources for the equipment components of the systems used to practice the disclosed methods. Some level of customization of the components may be required based upon the desired temperature range, pressure range, local regulations, etc. Exemplary equipment suppliers include Parr Instrument Company and components made from stainless steel.

The reactor is heated to a temperature ranging from approximately 250° C. to approximately 360° C., preferably from approximately 280° C. to approximately 360° C. The reactor is maintained above vacuum pressure at a pressure ranging from approximately 1 atm (101 kPa) to approximately 3 atm (303 kPa). The $Si_nH_{(2n+2)}$ reactant(s) is/are fed into the heated reactor. As this is a pyrolysis reaction, the reactor does not contain any glass wool or catalysts, just the $Si_nH_{(2n+2)}$ reactant(s). The reactants are maintained in the reactor for a period of time ranging from approximately 0.1 seconds to approximately 100 seconds, preferably from approximately 1 second to approximately 60 seconds. The contents of the reactor are directed to a distillation unit designed to isolate the tetrasilane product from the $Si_nH_{(2n+2)}$ reactants and any heavier silanes produced during the reaction. The $Si_nH_{(2n+2)}$ reactants may be recycled. The tetrasilane product is directed to a second distillation unit designed to isolate n-tetrasilane from i-tetrasilane.

The reaction may be performed in the presence or absence of unreactive gases, such as $H_2$, $N_2$, Ar or He. In one alternative, these unreactive gases may be used to maintain an inert atmosphere. In another alternative, these unreactive gases may be used to dilute the reaction mixture. In another alternative, these unreactive gases may be used to help maintain the flow of the reaction mixture. Of course, the addition of these unreactive gases further requires their removal from the reaction product. Therefore, in another alternative and as demonstrated in the examples that follow, no unreactive gases are utilized in the disclosed process.

FIG. 1 is a diagram of an exemplary system suitable to perform the disclosed methods. Air must be removed from various parts of the system (e.g., reactor 10, distillation unit 15, distillation unit 16) by vacuum and/or an inert gas (e.g., nitrogen, argon, etc.). The inert gas may also serve to pressurize the disilane source 11 and optional trisilane source 12 to permit delivery of the reactants to reactor 10. Nitrogen, refrigerated ethanol, an acetone/dry ice mixture, or heat transfer agents such as monoethylene glycol (MEG) or the heat transfer fluid sold under the trademark SYLTHERM™ by Dow Corning Corp. may be used to cool various parts of the system (e.g., distillation set up 15, distillation set up 16).

The reactor 10 may be maintained at the desired temperature by a heating jacket (not shown). The heating jacket may include an inlet and an outlet connected to a heat exchanger/chiller and/or pump (not shown) to provide recirculation of the heating fluid. Alternatively, the reactor 10 may be maintained at the desired temperature by heating tape or other electrical heating mechanisms (not shown). A temperature sensor (not shown) may be used to monitor the temperature of the contents of the reactor 10.

The reactor 10 and any and all components that come into contact with the disilane 11 and optional trisilane 12 reactants and any products and by-products ("contact components") must be clean and air- and moisture-free to prevent unintended reactions and/or contamination of the tetrasilane product 24. The reactor 10 and other contact components must be free of any impurities that may react with or contaminate the silanes. The reactor 10 and other contact components must also be compatible with the disilane 11 and optional trisilane 12 reactants, tetrasilane products, and any by-products.

The $Si_2H_6$ reactant 11 and optional $Si_3H_8$ reactant 12 are added to reactor 10 via lines 21 and 22, respectively. As shown in FIG. 1, the $Si_2H_6$ reactant 11 and optional $Si_3H_8$ reactant 12 may be mixed in line 23 before introduction into reactor 10. Alternatively, the $Si_2H_6$ reactant 11 and optional $Si_3H_8$ reactant 12 may be directly introduced into reactor 10 via lines 21 and 22 (not shown). The $Si_2H_6$ reactant 11 and optional $Si_3H_8$ reactant 12 may be added to the reactor 10 via a liquid metering pump (not shown), such as a diaphragm pump, peristaltic pump, or syringe pump. Preferably, the mixing is performed under an inert atmosphere at approximately atmospheric pressure.

Upon completion of the addition, the progress of the reaction may be monitored using, for example, gas chromatography. Upon completion of the reaction, the mixture 20 is removed from reactor 10 by pressure difference. The predominant reaction products are $SiH_4$, $Si_4H_{10}$, $Si_5H_{12}$, etc.

The mixture 20 may be collected in containers (not shown) and transported to a new location prior to performance of the next process steps. Alternatively, the mixture 20 may immediately be directed to a distillation unit 15 to further isolate the reaction product from any reactants and reaction by-products. The distillation unit 15 separates the $Si_4H_{10}$ product 24 from the $SiH_4$ reaction product 25, the $Si_nH_{2n+2}$ with n≥5 reaction by-products 26, and any unreacted $Si_2H_6$ reactant 31 and optional $Si_3H_8$ reactant 32.

Once again, the $Si_4H_{10}$ product 24 may be transported to a new location prior to performance of the next process steps. Alternatively, the $Si_4H_{10}$ product 24 may be directed to a fractional distillation unit 16 to separate n-tetrasilane 27 from i-tetrasilane 28.

One of ordinary skill in the art will recognize that the exemplary system of FIG. 1 may be used to produce single batches of mixture 20 or, alternatively, may utilize a flow-through design to continuously produce mixture 20.

Figure 2:
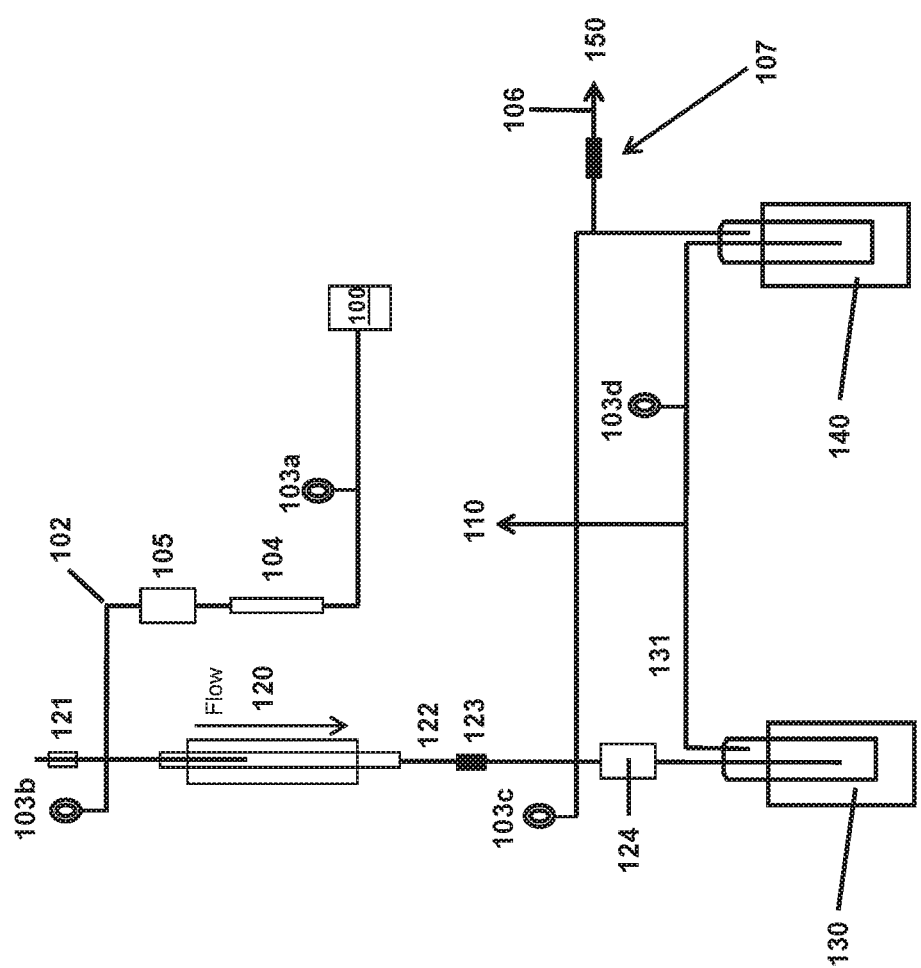
FIG. 2 is a schematic diagram of an exemplary flow-through apparatus in which the disclosed synthesis methods may be performed.

FIG. 2 is a diagram of an exemplary flow reactor 120 suitable to perform the disclosed methods. Please note that valves have not been included in this figure to make the figure easier to read.

The $Si_nH_{(2n+2)}$ reactant 100 is pressurized with nitrogen in order to supply the $Si_nH_{(2n+2)}$ reactant to the flow reactor 120 via line 102. Line 102 may include gauges 103a and 103b, flow meter 104, and flow regulator 105. The flow meter 104 measures the rate of reactant addition. Exemplary flow meters 104 suitable for use in the present method include flow meters available from Cole-Palmer. The flow regulator 105 controls the flow of the $Si_nH_{(2n+2)}$ reactant 100. The flow regulator 105 may be a graduated needle valve, electronic flow meter, etc. The gauges 103a and 103b measures the pressure and may communicate with the flow regulator 105 to adjust accordingly.

Flow reactor 120 includes a thermocouples 121 immersed in the flow reactor 120. More or fewer may be used without departing from the teachings herein. Exemplary thermocouples suitable for use in the teaching herein include Type K or Type J thermocouples.

The $Si_nH_{(2n+2)}$ reaction mixture exits the flow reactor 120 via line 122. Any $Si_nH_{(2n+2)}$ reaction products with a≥5 are captured in filter 123. Pressure regulator 124 and gauge 103c provide the pressure differential that move the $Si_nH_{(2n+2)}$ reaction mixture from the flow reactor 120 to the dry ice/isopropanol trap 130. The dry ice/isopropanol trap 130 captures any $Si_nH_{(2n+2)}$ reaction products that condense above approximately −78° C.

Any volatile $Si_nH_{(2n+2)}$ reaction mixture that is not captured in the dry ice/isopropanol trap is condensed via line 131 to a liquid nitrogen trap 140. The liquid nitrogen trap 140 captures any $Si_nH_{(2n+2)}$ reaction products that condense below approximately −78° C. to approximately −196° C. Line 131 is also connected to vacuum line 110. Pressure gauge 103d monitors pressure in line 131. $SiH_4$ by-product is sent to an exhaust scrubber (not shown) via line 150. $N_2$ 106 is used to dilute the $SiH_4$ by-product on its way to the exhaust scrubber. Check valve 107 prevent backflow of this pyrophoric by-product.

Figure 3:
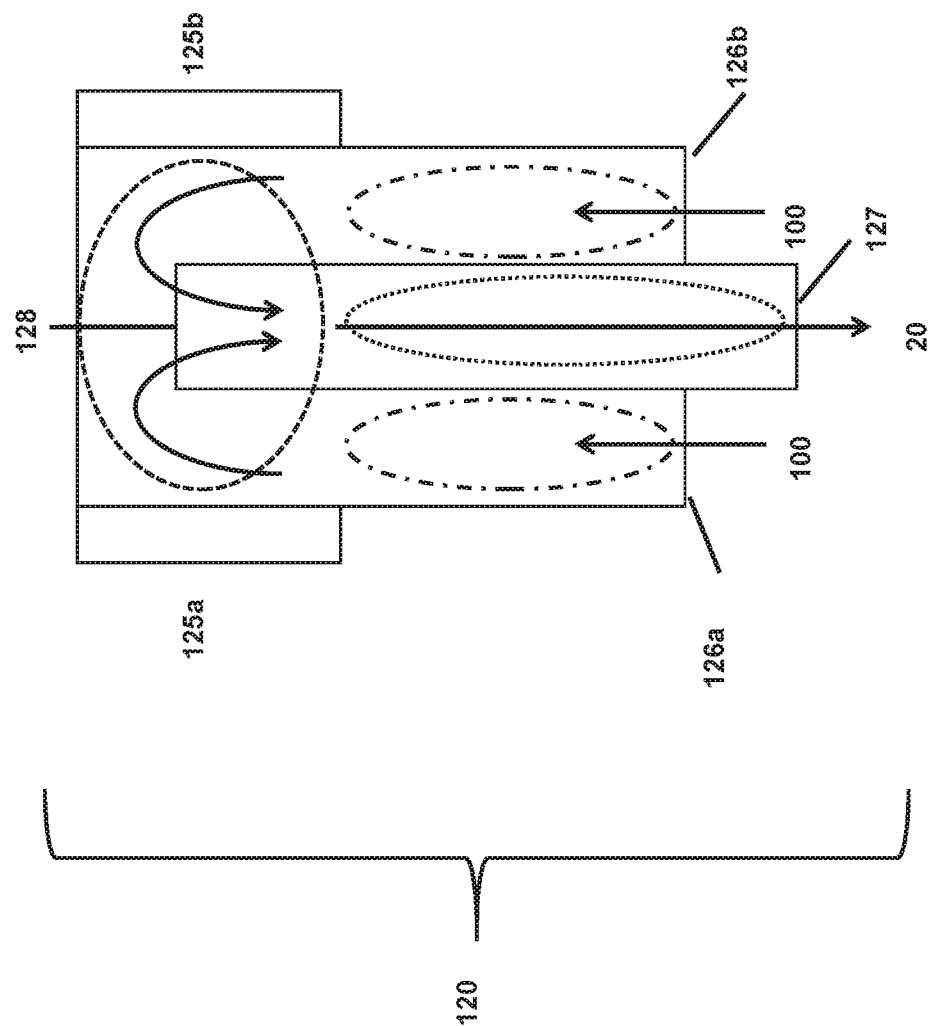
FIG. 3 is a plan diagram of one embodiment of the reactor of FIG. 2.

FIG. 3 is a plan diagram of the flow reactor 120 of FIG. 2. The plan diagram of the flow reactor 120 includes two heaters, 125a and 125b, and two exterior inlets, 126a and 126b, surrounding an interior outlet 127. One of ordinary skill in the art will recognize that heaters 125a and 125b and exterior inlets 126a and 126b may be connected and therefore one and the same when the flow reactor 120 is circular, square, or any other 3-dimensional shape. Alternatively, the heaters 125a and 125b and exterior inlets 126a and 126b may be located on opposing sides of the flow reactor 120, as illustrated.

The walls of the inlets 126a and 126b and outlet 127 may be constructed of stainless steel. For example, outlet 127 may be formed from a hollow cylindrical stainless steel tube surrounded by a larger cylindrical stainless steel tube which is closed at one end and forms inlets 126a and 126b on the open end. Heaters 125a and 125b may be electrical tape wrapped around the closed end of the larger cylindrical tube. Alternatively, both ends of both cylindrical stainless steel tubes may be sealed and include injection ports, pressure gauges, diaphragm valves, etc., to permit the introduction of the reactants and removal of the products. In another alternative, outlet 127 may be formed from a hollow rectangular stainless steel tube surrounded by a hollow U-shaped rectangular steel tube having openings at inlets 126a and 126b and at opening 128.

The design of the flow reactor 120 produces three different zones: a pre-heating zone, indicated by the dotted-dashed oval; a heating zone, indicated by the dashed oval; and a cooling zone, indicated by the dotted oval. The $Si_nH_{(2n+2)}$ reactant 100 is introduced into the inlets 126a and 126b of the flow reactor 120. Some pre-heating occurs in the pre-heating zone before the $Si_nH_{2n+2)}$ reactant 100 transitions to the heating zone. The $Si_nH_{(2n+2)}$ reaction mixture 20 transitions through the cooling zone and exits the flow reactor 120 at outlet 127.

As shown in the examples that follow, pyrolysis of $Si_3H_8$ alone leads to formation of tetra-, penta- and higher silanes and the tetrasilane yield is low. Tetrasilane obtained from pyrolysis of $Si_3H_8$ also presents as a mixture of n-$Si_4H_{10}$ and i-$Si_4H_{10}$ with ~3:1 ratio. As a result, the two isomers are difficult to separate. The fraction of Tetrasilane in the reaction product increases when $Si_3H_8$ is diluted with $Si_2H_6$. Dilution of $Si_3H_8$ with $Si_2H_6$ also produces a higher n-$Si_4H_{10}$:i-$Si_4H_{10}$ ratio, making separation of the two isomers easier. For example, a mixture comprising between approximately 75% mol/mol and 99.9% mol/mol $Si_2H_6$ and between approximately 0.1% mol/mol to approximately 25% mol/mol $Si_3H_8$ produces a n-$Si_4H_{10}$:i-$Si_4H_{10}$ silane mixture having a ratio ranging from approximately 5:1 to approximately 15:1. A mixture comprising between approximately 90% mol/mol and 99.9% mol/mol $Si_2H_6$ and between approximately 0.1% mol/mol to approximately 10% mol/mol $Si_3H_8$ produces a n-$Si_4H_{10}$:i-$Si_4H_{10}$ mixture having a ratio ranging from approximately 8:1 to approximately 15:1.

Fractional distillation of the n-$Si_4H_{10}$:i-$Si_4H_{10}$ mixture produce a Si-containing film forming composition comprising between approximately 90% w/w to approximately 100% w/w n-$Si_4H_{10}$, preferably between approximately 95% w/w to approximately 100% w/w n-$Si_4H_{10}$, and more preferably between approximately 97% w/w to approximately 100% w/w n-$Si_4H_{10}$. The Si-containing film forming compositions further comprises between approximately 0% w/w to approximately 10% w/w i-$Si_4H_{10}$, preferably between approximately 0% w/w to approximately 5% w/w i-$Si_4H_{10}$; and more preferably between approximately 0% w/w to approximately 3% w/w i-$Si_4H_{10}$. For example, after fractional distillation of approximately 192 grams of a 3:1 n-$Si_4H_{10}$:i-$Si_4H_{10}$ mixture using a 1 cm diameter and 100 cm long spinning band distillation column, Applicants have been able to produce approximately 90% w/w to approximately 95% w/w n-tetrasilane. One of ordinary skill in the art will recognize that higher purity n-tetrasilane would be obtained from mixtures having a higher n-$Si_4H_{10}$:i-$Si_4H_{10}$ ratio and/or larger distillation columns.

Preferably, the Si-containing film forming compositions has a purity ranging from approximately 97% mol/mol to approximately 100% mol/mol, preferably from approximately 99% mol/mol to approximately 100% mol/mol, more preferably from approximately 99.5% mol/mol to approximately 100% mol/mol, and even more preferably from approximately 99.97% mol/mol to approximately 100% mol/mol.

The Si-containing film forming compositions preferably comprise between the detection limit and 100 ppbw of each potential metal contaminant (e.g., at least Ag, Al, Au, Ca, Cr, Cu, Fe, Mg, Mo, Ni, K, Na, Sb, Ti, Zn, etc.).

The concentration of X (wherein X=Cl, Br, or I) in the Si-containing film forming compositions may range from approximately 0 ppmw to approximately 100 ppmw, and more preferably from approximately 0 ppmw and to approximately 10 ppmw.

As shown in the examples below, the purified product may be analyzed by gas chromatography mass spectrometry (GCMS). The structure of the product may be confirmed by $^1H$ and/or $^{29}Si$ NMR.

As discussed in detail above, the Si-containing film forming compositions must be stored in a clean dry storage vessel with which it does not react in order to maintain its purity.

The advantages of the disclosed synthesis methods are as follows:
- A catalyst free process, which helps reduce cost, contamination and product isolation issues;
- A halide free process, which helps reduce cost, contamination and product isolation issues;
- Many of the starting materials are inexpensive and readily available;
- One step reactions in one reactor;
- The process is solventless;
- Easier purification;
- A low reaction exotherm, or absence of a temperature spike, eliminates the need for precise temperature regulation during the process; and
- The waste generation is minimal and environmentally benign.

Also disclosed are methods of using the Si-containing film forming compositions for vapor deposition methods. The disclosed methods provide for the use of the Si-containing film forming compositions for deposition of silicon-containing films. The disclosed methods may be useful in the manufacture of semiconductor, photovoltaic, LCD-TFT, or flat panel type devices. The method includes: introducing the vapor of the Si-containing film forming compositions into a reactor having a substrate disposed therein and depositing at least part of the Si-containing film forming compositions onto the substrate via a deposition process to form a Si-containing layer.

A silicon-containing film, such as an elemental silicon film, may be formed on the substrate using the Si-containing film forming compositions obtained as described above in vapor deposition methods known in the art. Specific examples of the deposition methods include but are not limited to chemical vapor deposition (CVD), atomic layer deposition (ALD), plasma source enhanced chemical vapor deposition (PECVD), plasma source enhanced atomic layer deposition (PEALD), pulsed chemical vapor deposition, low pressure chemical vapor deposition (LPCVD), spatial ALD (CVD), spatial CVD (S-ALD), sub-atmospheric pressure chemical vapor deposition, and atmospheric pressure chemical vapor deposition (APCVD). Among these, thermal CVD deposition is preferred for a process where a high deposition rate, excellent film uniformity, and conformal film quality are required. Thermal ALD deposition is preferred for a process that forms a film having the high uniformity under severe conditions (e.g., trenches, holes, or vias). In one alternative, a PECVD deposition is preferred, particularly when fast growth, conformality, process-orientation and one direction films are required. In another alternative, a PEALD deposition process is preferred, particularly when superior conformality of films deposited on challenging surfaces (e.g., trenches, holes, and vias) is required.

The Si-containing film forming compositions may also be used to form a bimetal-containing layer on a substrate using a vapor deposition process and, more particularly, for deposition of $SiMO_x$ or $SiMN_x$ films, wherein x may be 0-4 and M is Ta, Nb, V, Hf, Zr, Ti, Al, B, C, P, As, Ge, lanthanides (such as Er), or combinations thereof.

The Si-containing film forming compositions may be used to form silicon-containing layers on substrates may be useful in the manufacture of semiconductor, photovoltaic, LCD-TFT, or flat panel type devices. The Si-containing film forming compositions may deposit Si-containing films using any vapor deposition methods known in the art. Examples of suitable vapor deposition methods include chemical vapor deposition (CVD) or atomic layer deposition (ALD). Exemplary CVD methods include thermal CVD, plasma enhanced CVD (PECVD), pulsed CVD (PCVD), low pressure CVD (LPCVD), sub-atmospheric CVD (SACVD) or atmospheric pressure CVD (APCVD), flowable CVD (f-CVD), metal organic chemical vapor deposition (MOCVD), hot-wire CVD (HWCVD, also known as cat-CVD, in which a hot wire serves as an energy source for the deposition process), radicals incorporated CVD, and combinations thereof. Exemplary ALD methods include thermal ALD, plasma enhanced ALD (PEALD), spatial isolation ALD, hot-wire ALD (HWALD), radicals incorporated ALD, and combinations thereof. Super critical fluid deposition may also be used. The deposition method is preferably ALD, spatial ALD, or PE-ALD in order to provide suitable step coverage and film thickness control.

The vapor of the Si-containing film forming compositions is introduced into a reaction chamber containing a substrate. The temperature and the pressure within the reaction chamber and the temperature of the substrate are held at conditions suitable for vapor deposition of at least part of the Si-containing film forming compositions onto the substrate. In other words, after introduction of the vaporized composition into the chamber, conditions within the chamber are such that at least part of the vaporized precursor deposits onto the substrate to form the silicon-containing film. A co-reactant may also be used to help in formation of the Si-containing layer.

The reaction chamber may be any enclosure or chamber of a device in which deposition methods take place, such as, without limitation, a parallel-plate type reactor, a cold-wall type reactor, a hot-wall type reactor, a single-wafer reactor, a multi-wafer reactor, or other such types of deposition systems. All of these exemplary reaction chambers are capable of serving as an ALD reaction chamber. The reaction chamber may be maintained at a pressure ranging from about 0.5 mTorr to about 760 Torr. In addition, the temperature within the reaction chamber may range from about 20° C. to about 700° C. One of ordinary skill in the art will recognize that the temperature may be optimized through mere experimentation to achieve the desired result.

The temperature of the reactor may be controlled by either controlling the temperature of the substrate holder and/or controlling the temperature of the reactor wall. Devices used to heat the substrate are known in the art. The reactor wall may be heated to a sufficient temperature to obtain the desired film at a sufficient growth rate and with desired physical state and composition. A non-limiting exemplary temperature range to which the reactor wall may be heated includes from approximately 20° C. to approximately 700° C. When a plasma deposition process is utilized, the deposition temperature may range from approximately 20° C. to approximately 550° C. Alternatively, when a thermal process is performed, the deposition temperature may range from approximately 300° C. to approximately 700° C.

Alternatively, the substrate may be heated to a sufficient temperature to obtain the desired silicon-containing film at a sufficient growth rate and with desired physical state and composition. A non-limiting exemplary temperature range to which the substrate may be heated includes from 150° C. to 700° C. Preferably, the temperature of the substrate remains less than or equal to 500° C.

The type of substrate upon which the silicon-containing film will be deposited will vary depending on the final use intended. A substrate is generally defined as the material on which a process is conducted. The substrates include, but are not limited to, any suitable substrate used in semiconductor, photovoltaic, flat panel, or LCD-TFT device manufacturing. Examples of suitable substrates include wafers, such as silicon, silica, glass, Ge, or GaAs wafers. The wafer may have one or more layers of differing materials deposited on it from a previous manufacturing step. For example, the wafers may include silicon layers (crystalline, amorphous, porous, etc.), silicon oxide layers, silicon nitride layers, silicon oxy nitride layers, carbon doped silicon oxide (SiCOH) layers, or combinations thereof. Additionally, the wafers may include copper layers, tungsten layers or metal layers (e.g. platinum, palladium, nickel, rhodium, or gold). The wafers may include barrier layers, such as manganese, manganese oxide, tantalum, tantalum nitride, etc. The layers may be planar or patterned. In some embodiments, the substrate may be coated with a patterned photoresist film. In some embodiments, the substrate may include layers of oxides which are used as dielectric materials in MIM, DRAM, or FeRam technologies (for example, $ZrO_2$ based materials, $HfO_2$ based materials, $TiO_2$ based materials, rare earth oxide based materials, ternary oxide based materials, etc.) or from nitride-based films (for example, TaN) that are used as electromigration barrier and adhesion layer between copper and the low-k layer. The disclosed processes may deposit the silicon-containing layer directly on the wafer or directly on one or more than one (when patterned layers form the substrate) of the layers on top of the wafer. Furthermore, one of ordinary skill in the art will recognize that the terms "film" or "layer" used herein refers to a thickness of some material laid on or spread over a surface and that the surface may be a trench or a line. Throughout the specification and claims, the wafer and any associated layers thereon are referred to as substrates. The actual substrate utilized may also depend upon the specific precursor embodiment utilized. In many instances though, the preferred substrate utilized will be selected from hydrogenated carbon, TiN, SRO, Ru, and Si type substrates, such as polysilicon or crystalline silicon substrates.

The substrate may be patterned to include vias or trenches having high aspect ratios. For example, a conformal Si-containing film, such as SiN or $SiO_2$, may be deposited using any ALD technique on a through silicon via (TSV) having an aspect ratio ranging from approximately 20:1 to approximately 100:1.

The Si-containing film forming compositions may be supplied neat. Alternatively, the Si-containing film forming compositions may be blended with a solvent suitable for use in vapor deposition. The solvent may be selected from, among others, $C_1$-$C_{16}$ saturated or unsaturated hydrocarbons.

For vapor deposition, the Si-containing film forming compositions are introduced into a reactor in vapor form by conventional means, such as tubing and/or flow meters. The vapor form may be produced by vaporizing the Si-containing film forming compositions through a conventional vaporization step such as direct liquid injection, direct vapor draw in the absence of a carrier gas, by bubbling a carrier gas through the liquid, or by sweeping the vapors with a carrier gas without bubbling through the liquid. The Si-containing film forming compositions may be fed in liquid state to a vaporizer (Direct Liquid Injection) where it is vaporized and mixed with a carrier gas before it is introduced into the reactor.

Alternatively, the Si-containing film forming compositions may be vaporized by passing a carrier gas into a container containing the composition or by bubbling the carrier gas into the composition. The carrier gas may include, but is not limited to, Ar, He, or $N_2$, and mixtures thereof. The carrier gas and the composition are then introduced into the reactor as a vapor.

If necessary, the Si-containing film forming compositions may be heated to a temperature that permits the Si-containing film forming compositions to have a sufficient vapor pressure. The Si-containing film forming compositions may be maintained at temperatures in the range of, for example, 0-150° C. Those skilled in the art recognize that the temperature of the Si-containing film forming compositions may be adjusted in a known manner to control the amount of Si-containing film forming compositions vaporized.

In addition to the disclosed composition, a reaction gas may also be introduced into the reactor. The reaction gas may be an oxidizing agent such as $O_2$; $O_3$; $H_2O$; $H_2O_2$; oxygen containing radicals such as $O^-$ or $OH^-$; NO; $NO_2$; carboxylic acids such as formic acid, acetic acid, propionic acid; radical species of NO, $NO_2$, or the carboxylic acids; para-formaldehyde; and mixtures thereof. Preferably, the oxidizing agent is selected from the group consisting of $O_2$, $O_3$, $H_2O$, $H_2O_2$, oxygen containing radicals thereof such as $O^-$ or $OH^-$, and mixtures thereof. Preferably, when an ALD process is performed, the co-reactant is plasma treated oxygen, ozone, or combinations thereof. When an oxidizing gas is used, the resulting silicon containing film will also contain oxygen.

Alternatively, the reaction gas may $H_2$, $NH_3$, $(SiH_3)_3N$, hydridosilanes (such as $SiH_4$, $Si_2H_6$, $Si_3H_8$, $Si_4H_{10}$, $Si_5H_{10}$, $Si_6H_{12}$), chlorosilanes and chloropolysilanes (such as $SiHCl_3$, $SiH_2Cl_2$, $SiH_3Cl$, $Si_2Cl_6$, $Si_2HCl_5$, $Si_3Cl_8$), alkylsilanes (such as $Me_2SiH_2$, $Et_2SiH_2$, $MeSiH_3$, $EtSiH_3$), hydrazines (such as $N_2H_4$, $MeHNNH_2$, MeHNNHMe), organic amines (such as $NMeH_2$, $NEtH_2$, $NMe_2H$, $NEt_2H$, $NMe_3$, $NEt_3$, $(SiMe_3)_2NH$), diamines such as ethylene diamine, dimethylethylene diamine, tetramethylethylene diamine, pyrazoline, pyridine, B-containing molecules (such as $B_2H_6$, trimethylboron, triethylboron, borazine, substituted borazine, dialkylaminoboranes), alkyl metals (such as trimethylaluminum, triethylaluminum, dimethylzinc, diethylzinc), radical species thereof, or mixtures thereof. When $H_2$ or an inorganic Si containing gas is used, the resulting silicon containing film may be pure Si.

In another alternative, the reaction gas may be a hydrocarbon, saturated or unsaturated, linear, branched or cyclic, such as but not limited to ethylene, acetylene, propylene, isoprene, cyclohexane, cyclohexene, cyclohexadiene, pentene, pentyne, cyclopentane, butadiene, cyclobutane, terpinene, octane, octene, or combinations thereof.

The reaction gas may be treated by a plasma, in order to decompose the reaction gas into its radical form. $N_2$ may also be utilized as a reducing agent when treated with plasma. For instance, the plasma may be generated with a power ranging from about 50 W to about 500 W, preferably from about 100 W to about 200 W. The plasma may be generated or present within the reactor itself. Alternatively, the plasma may generally be at a location removed from the reactor, for instance, in a remotely located plasma system. One of skill in the art will recognize methods and apparatus suitable for such plasma treatment.

The desired silicon-containing film also contains another element, such as, for example and without limitation, B, P, As, Zr, Hf, Ti, Nb, V, Ta, Al, Si, or Ge.

The Si-containing film forming compositions and one or more co-reactants may be introduced into the reaction chamber simultaneously (chemical vapor deposition), sequentially (atomic layer deposition), or in other combinations. For example, the vapor of the Si-containing film forming compositions may be introduced in one pulse and two additional metal sources may be introduced together in a separate pulse (modified atomic layer deposition). Alternatively, the reaction chamber may already contain the co-reactant prior to introduction of the Si-containing film forming compositions. The co-reactant may be passed through a plasma system localized within or remote from the reaction chamber, and decomposed to radicals. Alternatively, the Si-containing film forming compositions may be introduced to the reaction chamber continuously while other precursors or reactants are introduced by pulse (pulsed-chemical vapor deposition). In another alternative, the Si-containing film forming compositions and one or more co-reactants may be simultaneously sprayed from a shower head under which a susceptor holding several wafers is spun (spatial ALD).

In one non-limiting exemplary atomic layer deposition process, the vapor phase of the Si-containing film forming compositions is introduced into the reaction chamber, where it is contacted with a suitable substrate. Excess composition may then be removed from the reaction chamber by purging and/or evacuating the reaction chamber. An oxygen source is introduced into the reaction chamber where it reacts with the absorbed n-$Si_4H_{10}$ in a self-limiting manner. Any excess oxygen source is removed from the reaction chamber by purging and/or evacuating the reaction chamber. If the desired film is a silicon oxide film, this two-step process may provide the desired film thickness or may be repeated until a film having the necessary thickness has been obtained.

Alternatively, if the desired film is a silicon metal/metalloid oxide film (i.e., SiMOx, wherein x may be 0-4 and M is B, Zr, Hf, Ti, Nb, V, Ta, Al, Si, Ga, Ge, or combinations thereof), the two-step process above may be followed by introduction of a vapor of a metal- or metalloid-containing precursor into the reaction chamber. The metal- or metalloid-containing precursor will be selected based on the nature of the silicon metal/metalloid oxide film being deposited. After introduction into the reaction chamber, the metal- or metalloid-containing precursor is contacted with the substrate. Any excess metal- or metalloid-containing precursor is removed from the reaction chamber by purging and/or evacuating the reaction chamber. Once again, an oxygen source may be introduced into the reaction chamber to react with the metal- or metalloid-containing precursor. Excess oxygen source is removed from the reaction chamber by purging and/or evacuating the reaction chamber. If a desired film thickness has been achieved, the process may be terminated. However, if a thicker film is desired, the entire four-step process may be repeated. By alternating the provision of the Si-containing film forming compositions, metal- or metalloid-containing precursor, and oxygen source, a film of desired composition and thickness can be deposited.

Additionally, by varying the number of pulses, films having a desired stoichiometric M:Si ratio may be obtained. For example, a $SiMO_2$ film may be obtained by having one pulse of the Si-containing film forming compositions and one pulse of the metal- or metalloid-containing precursor, with each pulse being followed by a pulse of the oxygen source. However, one of ordinary skill in the art will recognize that the number of pulses required to obtain the desired film may not be identical to the stoichiometric ratio of the resulting film.

The silicon-containing films resulting from the processes discussed above may include $SiO_2$; SiC; SiN; SiON; SiOC; SiONC; SiBN; SiBCN; SiCN; SiMO, SiMN in which M is selected from Zr, Hf, Ti, Nb, V, Ta, Al, Ge, depending of course on the oxidation state of M. One of ordinary skill in the art will recognize that by judicial selection of the co-reactants, the desired film composition may be obtained.

Upon obtaining a desired film thickness, the film may be subject to further processing, such as thermal annealing, furnace-annealing, rapid thermal annealing, UV or e-beam curing, and/or plasma gas exposure. Those skilled in the art recognize the systems and methods utilized to perform these additional processing steps. For example, the silicon-containing film may be exposed to a temperature ranging from approximately 200° C. and approximately 1000° C. for a time ranging from approximately 0.1 second to approximately 7200 seconds under an inert atmosphere, a H-containing atmosphere, a N-containing atmosphere, or combinations thereof. Most preferably, the temperature is 600° C. for less than 3600 seconds. Even more preferably, the temperature is less than 400° C. The annealing step may be performed in the same reaction chamber in which the deposition process is performed. Alternatively, the substrate may be removed from the reaction chamber, with the annealing/flash annealing process being performed in a separate apparatus. Any of the above post-treatment methods, but especially UV-curing, has been found effective to enhance the connectivity and cross linking of the film, and to reduce the H content of the film when the film is a SiN containing film. Typically, a combination of thermal annealing to <400° C. (preferably about 100° C.-300° C.) and UV curing is used to obtain the film with the highest density.

For a further understanding of the nature and objects of the present invention, reference should be made to the following detailed description, taken in conjunction with the accompanying drawing wherein:

EXAMPLES

The following non-limiting examples are provided to further illustrate embodiments of the invention. However, the examples are not intended to be all inclusive and are not intended to limit the scope of the inventions described herein. The reaction products may be analyzed by any suitable means, such as by gas chromatography (GC) using part of the product stream or an aliquot of the product. In the following examples, GC analysis was performed on Agilent 7890A and Agilent 6890 Gas Chromatographs equipped with Thermal Conductivity Detector (TCD). The injection port was under inert ($N_2$ or Ar) atmosphere.

Exemplary GC method: Column: Rtx-1 (Cross bond Dimethyl Polysiloxane) 105 m×0.53 mm×5 µm. Detector T=250° C.; Reference flow: 20 mL/min; Makeup flow: 5 mL/min; Carrier gas: 5 mL/min (Helium); Oven: 35° C., 8 min, ramp 20° C./min, 200° C., 13 min; Injector: 200° C.; Splitless mode; Sample Size: 1.0 µL.

Example 1: Pyrolysis of $Si_2H_6$ at Different Temperatures

A ⅛" outer diameter stainless steel tubing reactor was wound around a cartridge heater and thermally insulated. The internal volume of the reactor was ~2 mL. The reactor was situated between a gas chromatography (GC) sample loop and the GC inlet. The 1 mL gas sample loop was filled with $Si_2H_6$ (purity 99.99% w/w) and transferred through the reactor directly into GC column by the He carrier flow (7.5 cc/min, 14.5 psig). The estimated residence time in the pyrolysis reactor was in the range of 15-17 seconds.

The results from different pyrolysis temperatures are summarized in Table 1 below:

TABLE 1

| Product | 300° C. | 320° C. | 340° C. | 360° C. |
|---|---|---|---|---|
| $SiH_4$ | 0.121% | 0.515% | 1.961% | 6.855% |
| $Si_2H_6$ | 99.512% | 97.857% | 91.990% | 73.549% |
| $Si_3H_8$ | 0.340% | 1.493% | 5.339% | 15.048% |
| $i\text{-}Si_4H_{10}$ | ND | 0.003% | 0.032% | 0.346% |
| $n\text{-}Si_4H_{10}$ | 0.024% | 0.121% | 0.578% | 2.925% |
| $Si_5H_{12}$ A | ND | 0.002% | 0.017% | 0.232% |
| $Si_5H_{12}$ B | 0.002% | 0.009% | 0.070% | 0.731% |
| $Si_6H_{14}$ B | ND | ND | 0.007% | 0.166% |
| $Si_6H_{14}$ C | ND | ND | 0.005% | 0.149% |

All % = w/w
ND = None Detected
Structures:

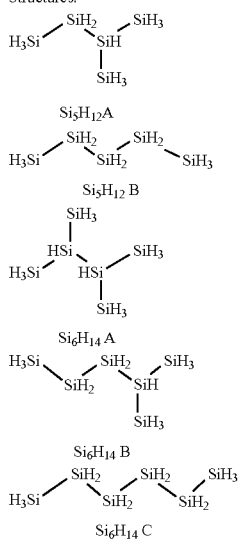

These results demonstrate the high selectivity of pyrolysis of $Si_2H_6$ toward $n\text{-}Si_4H_{10}$. The $n\text{-}Si_4H_{10}$:$i\text{-}Si_4H_{10}$ selectively decreases from 40.3:1 at 320° C. to 8.5:1 at 360° C. However, the absolute yield of $n\text{-}Si_4H_{10}$ at the temperatures where the solid products are not formed (i.e., 300-350° C.) is small. As a result, mixtures of $Si_2H_6$ and $Si_3H_8$ were pyrolyzed at lower temperatures in the examples that follow in order to achieve a higher yield of tetrasilane without formation of undesirable solid by-products.

Example 2: Pyrolysis of $Si_2H_6$/$Si_3H_8$ Mixture

Example 1 was repeated using a mixture of 8% mol/mol $Si_3H_8$ in 92% mol/mol $Si_2H_6$. The results are provided in Table 2.

TABLE 2

| Product | 20° C. | 300° C. | 320° C. | 340° C. |
|---|---|---|---|---|
| $SiH_4$ | 0.030% | 0.121% | 0.422% | 1.917% |
| $Si_2H_6$ | 87.318% | 85.464% | 85.147% | 81.465% |
| $Si_3H_8$ | 12.649% | 14.336% | 14.100% | 15.035% |
| $i\text{-}Si_4H_{10}$ | 0.001% | 0.008% | 0.032% | 0.150% |
| $n\text{-}Si_4H_{10}$ | 0.002% | 0.060% | 0.250% | 1.125% |
| $Si_5H_{12}$ A | ND | 0.002% | 0.009% | 0.059% |
| $Si_5H_{12}$ B | ND | 0.007% | 0.034% | 0.198% |
| $Si_6H_{14}$ A | ND | ND | 0.000% | 0.001% |
| $Si_6H_{14}$ B | ND | ND | 0.002% | 0.024% |
| $Si_6H_{14}$ C | ND | ND | 0.003% | 0.025% |

Figure 4:
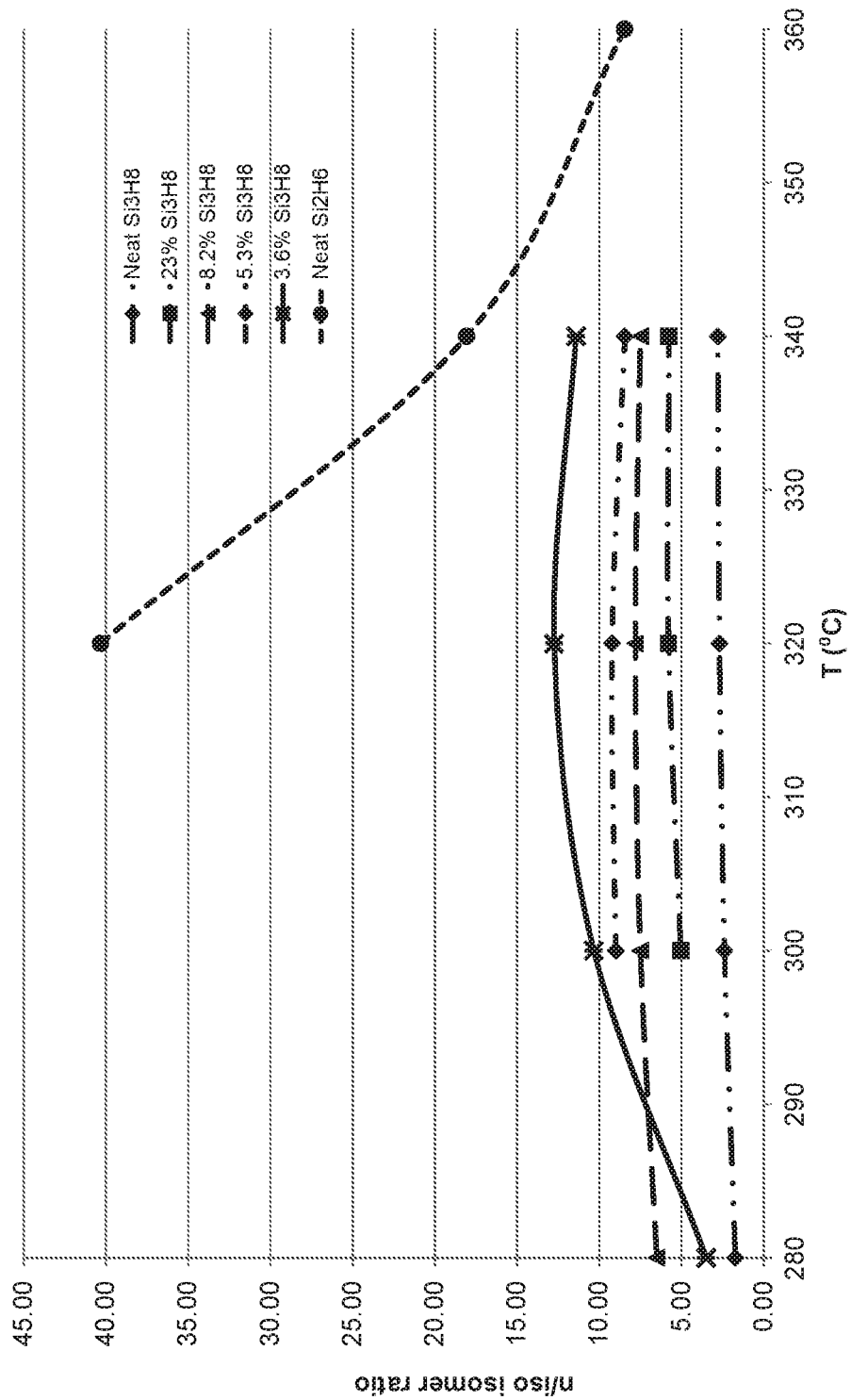
FIG. 4 is a graph of the n-$Si_4H_{10}$/i-$Si_4H_{10}$ ratio vs T (° C.) after pyrolysis of $Si_2H_6$, $Si_3H_8$ and $Si_3H_8$—$Si_2H_6$ mixtures.

All % = w/w
ND = None Detected
See Table 1 for Structures of $Si_5H_{12}$ A and B and $Si_6H_{14}$ A, B, and C Example 2 illustrates that the $n\text{-}Si_4H_{10}$:$i\text{-}Si_4H_{10}$ ratio remains similar at different temperatures. More particularly, the ratio is 7.5:1 at 300° C., 7.8:1 at 320° C., and 7.5:1 at 340° C. (FIG. 4). As shown in Example 1, this ratio decreases with increasing temperature for pyrolysis of disilane. As a result, this trend is not expected. This example demonstrates that pyrolysis from the mixture yields more tetrasilane than pyrolysis from pure disilane. As a result, different $Si_2H_6$/$Si_3H_8$ mixtures were studied in the examples that follow in order to demonstrate adjustment of the process conditions that produce the highest yield of tetrasilane with the highest selectivity toward the $n\text{-}Si_4H_{10}$.

Example 3: Pyrolysis of $Si_2H_6$/$Si_3H_8$ Mixtures

Example 2 was repeated with different $Si_2H_6$/$Si_3H_8$ mixtures as well as $Si_3H_8$ alone. The results are provided in Table 3 at 300° C. and FIG. 5 at 300° C. and 320° C.

TABLE 3

| % v/v $Si_3H_8$ in $Si_2H_6$ | $Si_4H_{10}$/ Heavier Silanes | Amount (% w/w) $n\text{-}Si_4H_{10}$/ $i\text{-}Si_4H_{10}$ at 320° C. | $n\text{-}Si_4H_{10}$/$i\text{-}Si_4H_{10}$ at 320° C. |
|---|---|---|---|
| 100 | 0.3 | 0.121/0.003 | 2.7 |
| 23 | 1.6 | 0.405/0.07 | 5.8 |
| 8 | 5.9 | 0.250/0.032 | 7.8 |
| 5 | 7.2 | 0.286/0.031 | 9.2 |
| 4 | 8.7 | 0.153/0.012 | 12.8 |

Figure 5:
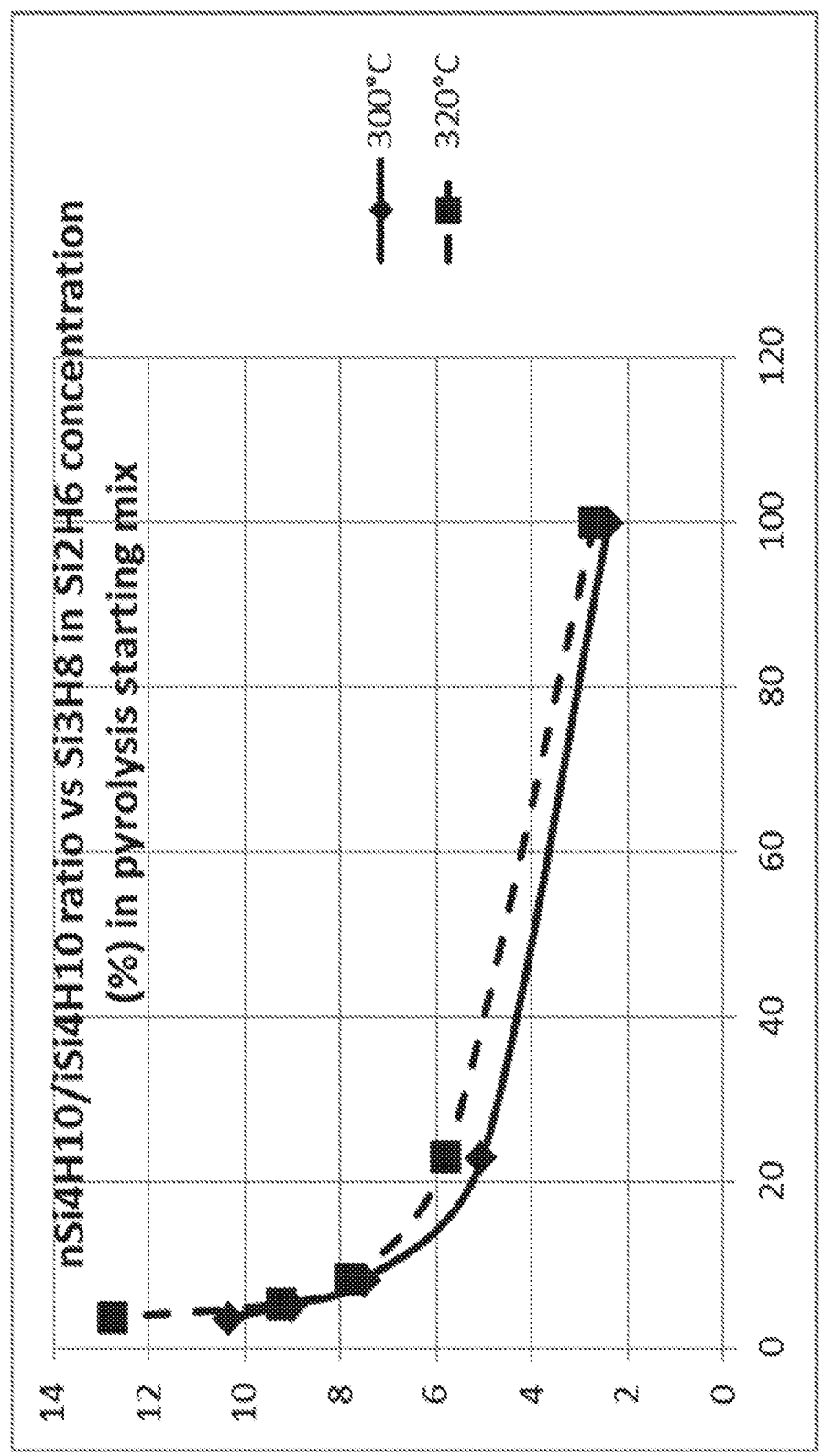
FIG. 5 is a graph of the ratio of $nSi_4H_{10}$:$iSi_4H_{10}$ vs the % mol/mol of $Si_3H_8$ in $Si_2H_6$ at 300° C. (diamond) and 320° C. (square)

FIG. 5 is a graph of the ratio of $nSi_4H_{10}$:$iSi_4H_{10}$ vs the % mol/mol of $Si_3H_8$ in $Si_2H_6$ at 300° C. (diamond) and 320° C. (square). As can be seen, a lower amount of $Si_3H_8$ produces a higher amount of $n\text{-}Si_4H_{10}$. In comparison, FIG. 5 of WO2017/018772 demonstrates that very little tetrasilane is generated from the pyrolysis of $Si_2H_6$ at 300° C. and 320° C. and FIG. 7 demonstrates that the highest yield of tetrasilane is produced from pyrolysis of 50 mol % disilane and 50 mol % trisilane at 375° C. As a result, one of ordinary skill in the art would have no motivation to pyrolyze a predominantly $Si_2H_6$ reactant to produce $Si_4H_{10}$ because WO2017/018772 demonstrates that the yield would be too low. However, contrary to the teachings of WO2017/018772, the higher amount of n-tetrasilane produced from the lower ratio $Si_3H_8$:$Si_2H_6$ provides easier isolation and purification of n-tetrasilane suitable for use in vapor deposition and polymerization processes.

Small scale pyrolysis reactions were performed in Examples 1-3. Example 4 demonstrates that the process may be scaled to industrial volumes.

Example 4: Pyrolysis of $Si_2H_6$—$Si_3H_8$

Figure 6:
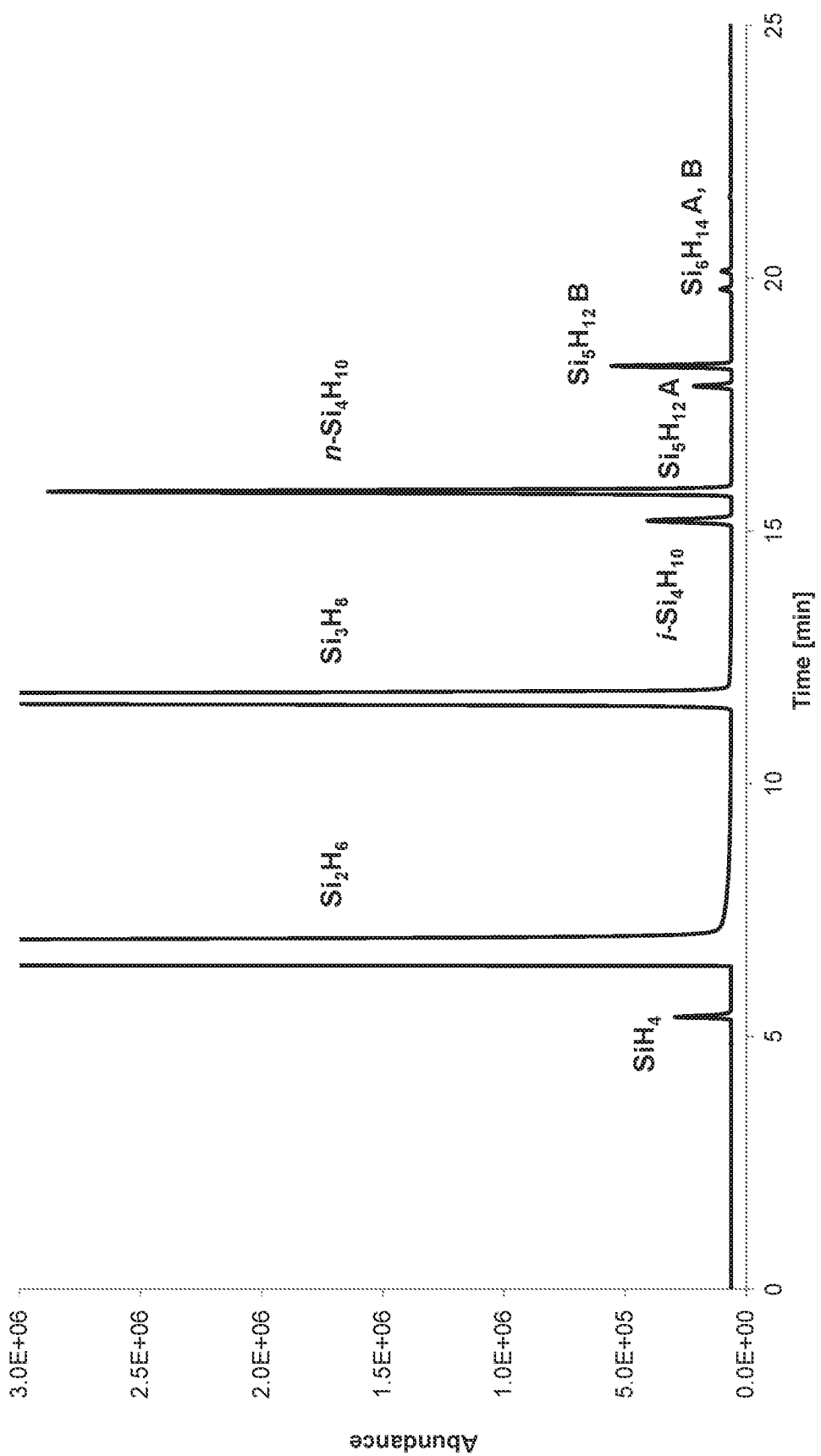
FIG. 6 is a gas chromatogram of the liquid products collected in a dry ice trap after pyrolysis of a $Si_2H_6$ (91.8% mol/mol) and $Si_3H_8$ (8.2% mol/mol) mixture of Example 4.

A 2.5 cm outer diameter×30.48 cm long stainless steel tube flow reactor with a 100 cm³ heated internal volume (and 154.44 cm³ total internal volume) is wrapped with a flexible heater and thermally insulated. The temperature of the flow reactor is controlled by a thermocouple located inside the stainless steel tube and a temperature controller. The pressure in the flow reactor is controlled by a back pressure regulator after the reactor. 79.8 g of a mixture containing 91.8% w/w of disilane (73.3 g, 1.18 mol, 99.99% w/w purity) and 8.2% w/w trisilane (6.54 g, 0.071 mol, 99.98% w/w purity) from the 49 L bottle passes through the flow reactor at 340° C., 1.7 psig pressure, and a flow rate of 247 sccm for a residence time of ~13 seconds. The pyrolysis products were collected in two consecutive traps cooled with dry ice (70.1 g collected) and liquid nitrogen (9.3 g collected). The collected products were analyzed by a GC equipped with a TCD detector. FIG. 6 is the GC spectra of the liquid products collected in the dry ice trap. The GC results from both the dry ice trap and the liquid nitrogen trap are provided in Table 4 below. No solids formation was observed in this experiment.

TABLE 4

| Product | Dry Ice Trap (%) | Liq. N$_2$ Trap (%) | Total (%) |
|---|---|---|---|
| SiH$_4$ | 0.054 | 11.561 | 1.402% |
| Si$_2$H$_6$ | 83.918 | 86.407 | 84.21% |
| Si$_3$H$_8$ | 14.927 | 1.903 | 13.402% |
| i-Si$_4$H$_{10}$ | 0.115 | 0.015 | 0.103% |
| i-Si$_4$H$_{10}$ | 0.805 | 0.097 | 0.722% |
| Si$_5$H$_{12}$ A | 0.040 | 0.004 | 0.036% |
| Si$_5$H$_{12}$ B | 0.118 | 0.011 | 0.105% |
| Si$_6$H$_{14}$ A | 0.001 | 0.001 | ND |
| Si$_6$H$_{14}$ B | 0.012 | 0.001 | ND |
| Si$_6$H$_{14}$ C | 0.010 | ND | ND |
| Si$_7$H$_{16}$ A | 0.002 | ND | ND |
| Si$_7$H$_{16}$ B | 0.001 | ND | ND |
| Si$_7$H$_{16}$ C | 0.001 | ND | ND |
| Si$_2$H$_6$ conversion | | | −3.56 |
| Si$_2$H$_6$ conversion rate, %/sec | | | −0.27 |
| Si$_3$H$_8$ conversion | | | 5.95 |
| Si$_3$H$_8$ increase rate, %/sec | | | 0.46 |
| Si$_4$H$_{10}$ increase rate, %/sec | | | 0.063 |
| Si$_4$H$_{10}$/Si$_5$H$_{12}$ ratio | | | 7.3 |
| n-Si$_4$H$_{10}$/i-Si$_4$H$_{10}$ ratio | | | 7.0 |

All % = w/w
ND = None Detected.
See Table 1 for Structures of Si$_5$H$_{12}$ A and B and Si$_6$H$_{14}$ A, B, and C
Total(%) = (ω(Si$_n$H$_{2n+2}$)$^d$ · m$^1$ + ω(Si$_n$H$_{2n+2}$)$^l$ · m$^2$)/(m$^1$ + m$^2$), where ω(Si$_n$H$_{2n+2}$)$^d$ is % w/w of each silane in dry ice trap, m$^1$ = 70.1 g, amount of product collected in dry ice trap, ω(Si$_n$H$_{2n+2}$)$^l$ is % w/w of each silane in liquid nitrogen trap, m$^2$ = 9.3 g, amount of product collected in liquid nitrogen trap.

These results are similar to those obtained in Example 2, demonstrating that the experiments are commercially scalable.

Example 5: n-Tetrasilane Separation by Spinning Band Distillation 192 g of starting material containing 24.6% of iso- and 74.8% of n-Tetrasilane were charged into a system consisting of a pot, a distillation head and a 1 m×1 cm spinning band distillation column. The pressure in the system was brought down to 50 T and the pot was warmed up. The light fraction (56 g) was removed at 30-32° C. head temperature. It contained 50.0% and 48.9% iso- and n-Tetrasilane, respectively. The product fraction (128 g) was collected up to 35° C. head temperature. It contained 9.1% and 90.8% of iso- and n-Tetrasilane respectively.

Example 6: Tetrasilane Shelflife Study

A shelf life study was performed to verify that the fixed ratio of 2 tetrasilane isomers remains stable at room temperature and 35° C. Tetrasilane obtained from a pyrolysis process was stored at room temperature in multiple containers. Another container was stored at 35° C. The liquid contents were measured by GC over time.

A 6 L aluminum cylinder was vacuum baked at 52° C. and 4.4×10$^{-6}$ Torr. 50 mL stainless steel vessels were vacuum baked at approximately 200° C. and 50 mTorr. 1.2 L stainless steel bubblers were vacuum baked at approximately 150° C. and 85 mTorr. The list of the containers under investigation and the amount of Tetrasilane in them are presented in Table 5.

TABLE 5

| Package | Total Volume (L) | Si$_4$H$_{10}$ load (g) | n-Si$_4$H$_{10}$ % w/w * | n-Si$_4$H$_{10}$:i-Si$_4$H$_{10}$ † |
|---|---|---|---|---|
| 1.2 L (RT) | 1.2 | 325 | 70.96 | 2.46 ± 0.04 |
| 1.2 L (35° C.) | 1.2 | 383 | 70.70 | 2.44 ± 0.01 |
| 6 L | 5.9 | 384 | 70.96 | 2.48 ± 0.02 |
| 50 cc coated | 0.05 | 6.8 | 78.61 | 3.78 ± 0.05 |
| 50 cc not coated | 0.05 | 6.5 | 78.61 | 3.75 ± 0.05 |

* Starting amount on day 1
† average ratio and standard deviation during the whole duration of experiment.

Figure 7:
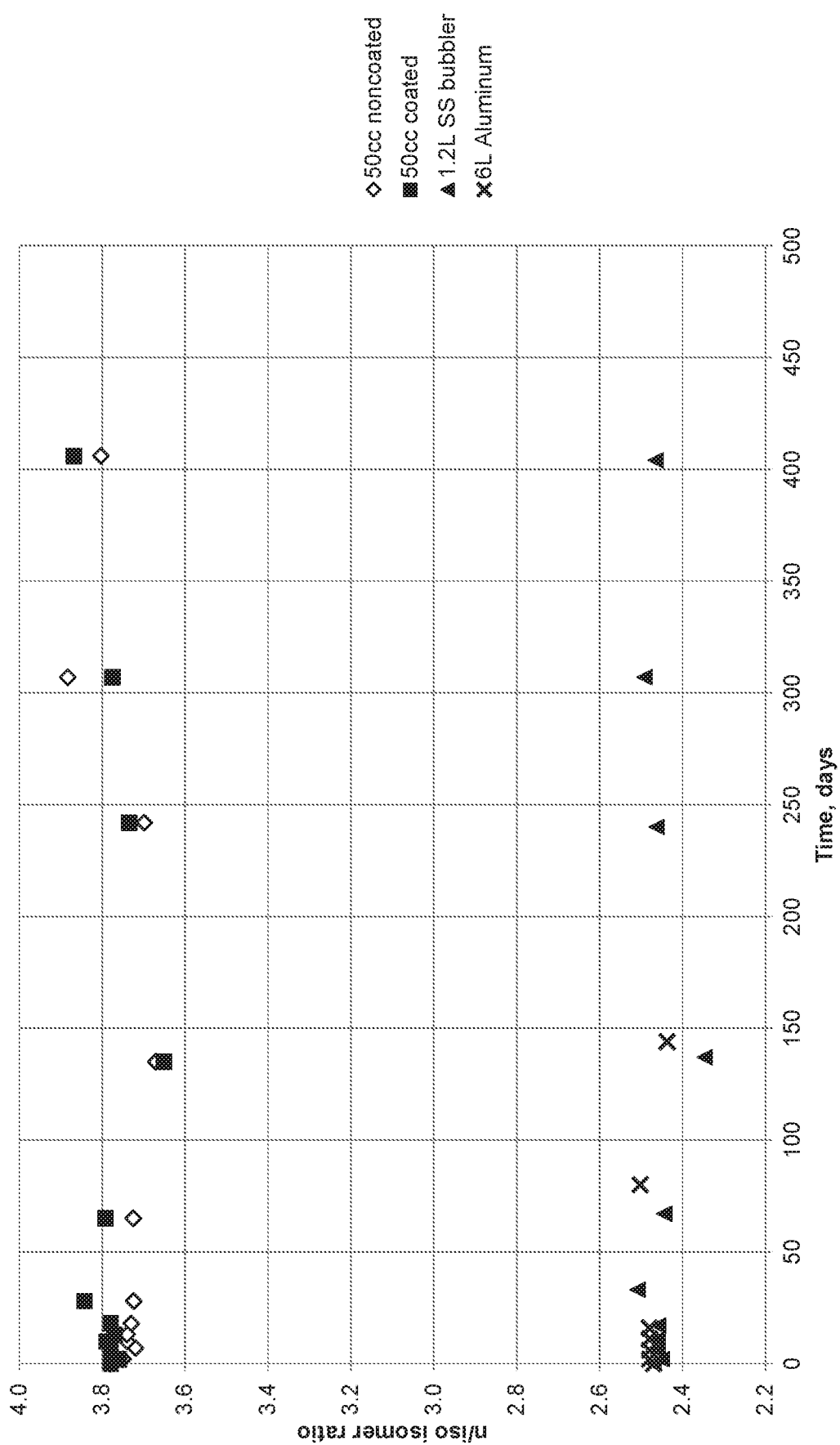
FIG. 7 is a graph of the n-$Si_4H_{10}$:i-$Si_4H_{10}$ ratio over time at ambient temperature.

FIG. 7 is a graph of the n-Si$_4$H$_{10}$:i-Si$_4$H$_{10}$ ratio over time at ambient temperature.

Figure 8:
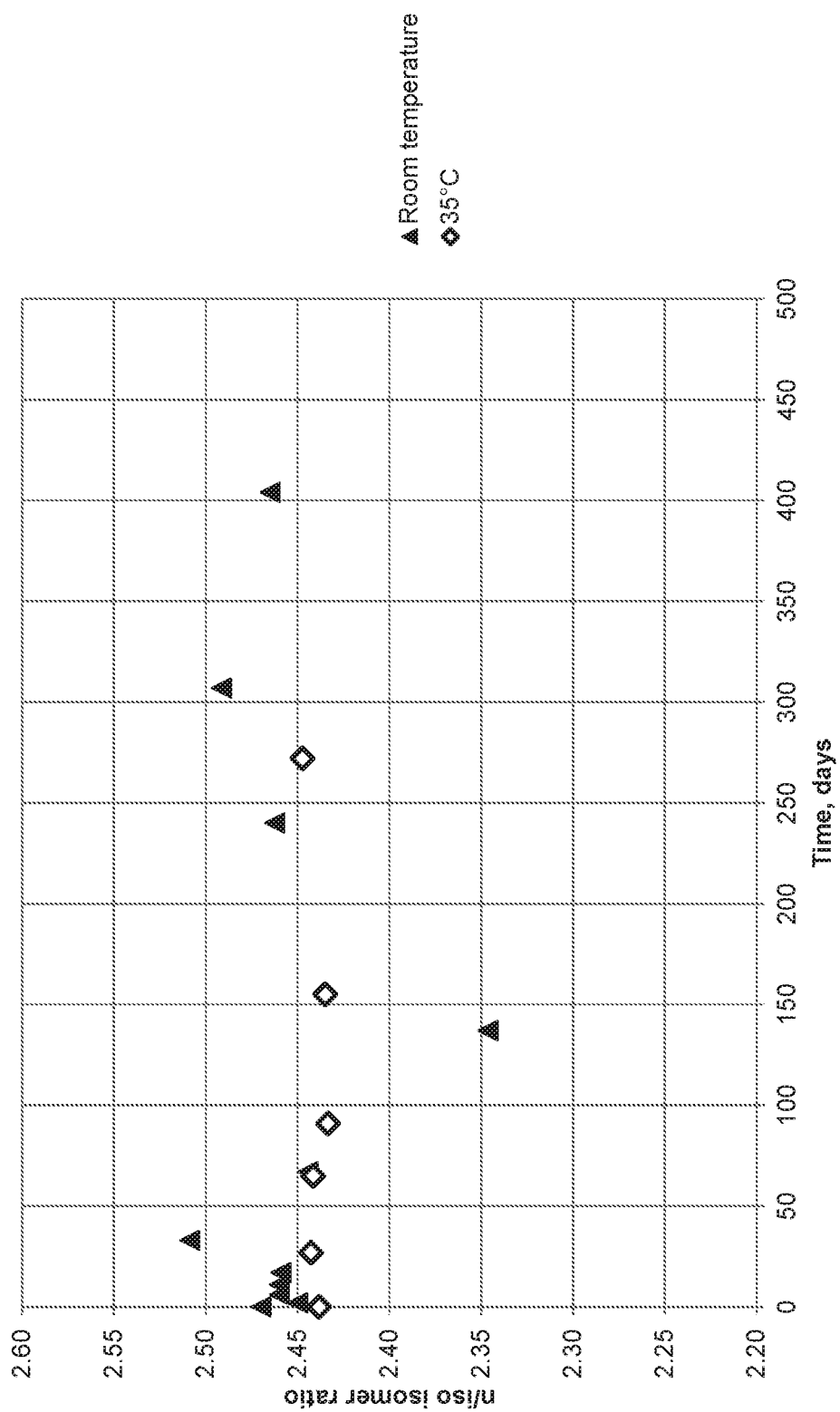
FIG. 8 is a graph of the n-$Si_4H_{10}$:i-$Si_4H_{10}$ ratio in a 1.2 L stainless steel bubbler over time at room temperature (triangle) or 35° C. (diamond).

FIG. 8 is a graph of the n-Si$_4$H$_{10}$:i-Si$_4$H$_{10}$ ratio in a 1.2 L stainless steel bubbler over time at room temperature (triangle) or 35° C. (square).

The ratio of isomers is similar in all experiments within 400 days. The deviation is below 2%. The highest deviation of n-Si$_4$H$_{10}$:i-Si$_4$H$_{10}$ ratio is 1.9% for the 50 cc non coated vessel. These results demonstrate the stability of compositions over time for vapor deposition.

The compositions tested contained 70-79% w/w of n-Si$_4$H$_{10}$ and 21-29% w/w of i-Si$_4$H$_{10}$. We anticipate that the compositions with 90-95% w/w of n-Si$_4$H$_{10}$ will behave in the same way, since the difference with the reported composition is 10-20% of n-Si$_4$H$_{10}$.

Comparative Example 1

German patent application DE-2139155 to Peter Plichta discloses the relative amounts of isomers of Si$_4$H$_{10}$, Si$_5$H$_{12}$, Si$_6$H$_{14}$, Si$_7$H$_{16}$, Si$_8$H$_{18}$ and Si$_9$H$_{20}$ obtained from pyrolysis in a high vacuum using a glass wool silica gel-platinum contact of Si$_3$H$_8$ at 420° C., n-Si$_4$H$_{10}$ at 410° C., and n-Si$_5$H$_{12}$ at 360° C. The isomers are isolated using gas chromatography at 220° C. The ratio of n-Si$_4$H$_{10}$:i-Si$_4$H$_{10}$=2.8:1 for pyrolysis of trisilane, which is close to statistical distribution 3:1. One would expect something similar for pyrolysis of disilane, but as shown in Example 1 above, the ratio n-Si$_4$H$_{10}$:i-Si$_4$H$_{10}$=18.1:1 at 340° C. is completely unexpected!

Comparative Example 2

In Example 1 of U.S. Pat. No. 8,163,261 to Hazeltine, pyrolysis of disilane at 350° C. produced 0.15% tetrasilane. The disilane residence time in the 30 foot preheater of ⅜" diameter and 50 L first reactor was calculated to be 42 seconds. In contrast, the 16 seconds of disilane residence time at 340° C. in Example 1 converted 8.01% disilane and produced a total 0.61% tetrasilane. The 16 second residence time at 360° C. in Example 1 converted 26.451% disilane and produced a total 3.27% tetrasilane, which is nearly a 20 times increase in tetrasilane yield over Hazeltine. The results of Example 1 directly contradict the teachings of Hazeltine at col. 3, lines 1-5 because the lower residence time of Example 1 both converted more disilane and produced more tetrasilane.

Comparative Example 3

Pyrolysis of silane, disilane, trisilane, and mixtures thereof is disclosed in PCT Pub Nos. WO2017/018771 and WO2017/018772, both to SK Materials Co Ltd. ("SK"). FIG. 4 is the same in both apps and shows that the % w/w conversion of disilane is approximately 4-5% at 350° C. and 360° C. The figures were produced from reactions in a stainless steel tube having an outer diameter of ½ inch, an inner diameter of 1.1 cm, and a length of 50 cm. The space velocity was set to 120/hour. This corresponds to a residence time of 30 seconds. However, as shown in Example 1 above, the 16 seconds of disilane residence time at 340° C. converted 8.01% disilane and at 360° C. converted 26.451% disilane, which is nearly a 5 times increase in disilane conversion over SK. Like Hazeltine in Comparative Example 2, SK states that increasing the gas space velocity has the advantage of reducing the amount of solid particles generated, but it increases the amount of unreacted feed gas so much that the volume of the reactor is increased and the operation cost is increased. The results of Example 1 directly contradict SK's teachings because the lower residence time of Example 1 converted more disilane.

In FIG. 12 of the '772 publication, SK discloses that pyrolysis at 375° C. of a 50/50 mixture of disilane and trisilane produces the most tetrasilane (i.e., 11.5 wt %). FIG. 13 of the '722 publication illustrates that the quantity of tetrasilane decreases for a 25/75 mixture of disilane and trisilane (8.7 wt %). FIG. 11 of the '772 publication discloses that the 50/50 mixture of disilane and trisilane also produces approximately 20% w/w solid powder polysilane by-products. FIG. 11 further demonstrates that solid reaction by-products are produced at temperatures above 350° C.

In contrast, as shown in Example 3 above, more n-tetrasilane is produced at lower volumes of $Si_3H_8$ in $Si_2H_6$. One of ordinary skill in the art having the SK publications before them would have no motivation to lower the quantity of trisilane in disilane as FIGS. 12 and 13 of the '772 publication expressly discloses that less tetrasilane is produced from a 75/25 disilane/trisilane mixture than from a 50/50 disilane/trisilane mixture. However, contrary to the teachings of WO2017/018772, the higher amount of n-tetrasilane produced from the lower ratio $Si_3H_8$:$Si_2H_6$ provides easier isolation and purification of n-tetrasilane suitable for use in vapor deposition and polymerization processes.

Comparative Example 4: Halide Concentration of Commercially Available n-Tetrasilane Commercially available n-tetrasilane from the catalog of an established commercial n-tetrasilane vendor was analyzed by GC. The commercially available product contains 34.3% w/w of i-$Si_4H_{10}$ and 64.1% w/w of n-$Si_4H_{10}$, while the total amount of $Si_4H_{10}$ is 98.4% w/w, and it contains $Si_2H_6$ 0.1% w/w, $Si_3H_8$ 0.5% w/w, $Si_5H_{12}$ 0.6% w/w, $Si_6H_{14}$ 0.3% w/w, $Si_7H_{16}$ 0.1% w/w. The ratio n-$Si_4H_{10}$:i-$Si_4H_{10}$=1.9:1. Such composition i-$Si_4H_{10}$/n-$Si_4H_{10}$ together with lower and higher silanes might create a vapor pressure drift over time due to the different boiling points of i-$Si_4H_{10}$ and n-$Si_4H_{10}$, lower and higher silanes. This may result in the irreproducible growth per cycle rate, which is not acceptable for a vapor deposition process.

While embodiments of this invention have been shown and described, modifications thereof can be made by one skilled in the art without departing from the spirit or teaching of this invention. The embodiments described herein are exemplary only and not limiting. Many variations and modifications of the composition and method are possible and within the scope of the invention. Accordingly the scope of protection is not limited to the embodiments described herein, but is only limited by the claims which follow, the scope of which shall include all equivalents of the subject matter of the claims.

What is claimed is:

1. A method of selectively synthesizing n-tetrasilane, the method comprising:
   producing a n-$Si_4H_{10}$:i-$Si_4H_{10}$ mixture having a ratio ranging from approximately 5:1 to approximately 15:1 by heating a mixture of $Si_2H_6$ and $Si_3H_8$ to a temperature ranging from approximately 250° C. to approximately 360° C. in an absence of a catalyst for converting the $Si_2H_6$ and $Si_3H_8$ mixture into the n-Si4H10:i-Si4H10 mixture, and
   fractionally distilling the n-$Si_4H_{10}$:i-$Si_4H_{10}$ mixture to produce a Si-containing film forming composition comprising approximately 90% w/w to approximately 100% w/w n-$Si_4H_{10}$.

2. The method of claim 1, further comprising maintaining the mixture of $Si_2H_6$ and $Si_3H_8$ at the temperature for a time period ranging from approximately 5 seconds to approximately 30 seconds.

3. The method of claim 1, wherein the mixture of $Si_2H_6$ and $Si_3H_8$ comprises between approximately 0.1% mol/mol to approximately 25% mol/mol $Si_3H_8$ and between approximately 75% mol/mol and 99.9% mol/mol $Si_2H_6$.

4. The method of claim 3, wherein the mixture of $Si_2H_6$ and $Si_3H_8$ comprises between approximately 0.1% mol/mol to approximately 10% mol/mol $Si_3H_8$ and between approximately 90% mol/mol and 99.9% mol/mol $Si_2H_6$.

5. The method of claim 4, wherein the ratio of n-$Si_4H_{10}$:i-$Si_4H_{10}$ ranges from approximately 8:1 to approximately 15:1.

6. The method of claim 1, further comprising pre-heating the mixture of $Si_2H_6$ and $Si_3H_8$.

7. The method of claim 6, further comprising cooling the n-$Si_4H_{10}$:i-$Si_4H_{10}$ mixture.

8. The method of claim 7, wherein the pre-heating and cooling occurs in a same reactor.

9. The method of claim 1, further comprising pre-heating the mixture of $Si_2H_6$ and optionally $Si_3H_8$.

10. The method of claim 9, further comprising cooling the n-$Si_4H_{10}$:i-$Si_4H_{10}$ mixture.

11. The method of claim 10, wherein the pre-heating and cooling occurs in a same reactor.

12. A method of selectively synthesizing n-tetrasilane, the method comprising:
   heating a mixture of $Si_2H_6$ and optionally $Si_3H_8$ in a reactor to a temperature ranging from approximately 250° C. to approximately 360° C. to produce a n-$Si_4H_{10}$:i-$Si_4H_{10}$ mixture having a ratio ranging from approximately 5:1 to approximately 15:1, in an absence of a catalyst for converting the $Si_2H_6$ and $Si_3H_8$ into the n-Si4H10:i-Si4H10 mixture, and
   fractionally distilling the n-$Si_4H_{10}$:i-$Si_4H_{10}$ mixture to produce a Si-containing film forming composition comprising approximately 90% w/w to approximately 100% w/w n-$Si_4H_{10}$.

13. The method of claim 12, further comprising maintaining the mixture of $Si_2H_6$ and optionally $Si_3H_8$ at the temperature for a time period ranging from approximately 5 seconds to approximately 30 seconds.

14. The method of claim 12, wherein the mixture of $Si_2H_6$ and optionally $Si_3H_8$ comprises between approximately 0.1% mol/mol to approximately 25% mol/mol $Si_3H_8$ and between approximately 75% mol/mol and 99.9% mol/mol $Si_2H_6$.

15. The method of claim 14, wherein the mixture of $Si_2H_6$ and optionally $Si_3H_8$ comprises between approximately 0.1% mol/mol to approximately 10% mol/mol $Si_3H_8$ and between approximately 90% mol/mol and 99.9% mol/mol $Si_2H_6$.

16. The method of claim 15, wherein the ratio of $n\text{-}Si_4H_{10}\text{:}i\text{-}Si_4H_{10}$ ranges from approximately 8:1 to approximately 15:1.

* * * * *